US010776651B2

(12) United States Patent
Yuvaraj et al.

(10) Patent No.: US 10,776,651 B2
(45) Date of Patent: Sep. 15, 2020

(54) MATERIAL HANDLING METHOD, APPARATUS, AND SYSTEM FOR IDENTIFICATION OF A REGION-OF-INTEREST

(71) Applicant: Intelligrated Headquarters, LLC, Mason, OH (US)

(72) Inventors: Karthikeyan Yuvaraj, Saint Louis, MO (US); Sriram Pavan Tankasala, St Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 39 days.

(21) Appl. No.: 16/251,978

(22) Filed: Jan. 18, 2019

(65) Prior Publication Data

US 2020/0234071 A1 Jul. 23, 2020

(51) Int. Cl.
*G06K 9/32* (2006.01)
*B25J 9/16* (2006.01)
(Continued)

(52) U.S. Cl.
CPC .......... *G06K 9/3233* (2013.01); *B25J 9/1697* (2013.01); *G06K 9/6218* (2013.01); *G06N 20/00* (2019.01);
(Continued)

(58) Field of Classification Search
CPC .......... G06T 7/73; G06N 20/00; B25J 9/1697; G06K 9/6218
See application file for complete search history.

(56) References Cited

U.S. PATENT DOCUMENTS 9,630,320 B1 4/2017 Konolige et al.
9,744,669 B2 8/2017 Wicks et al.
(Continued)

FOREIGN PATENT DOCUMENTS

WO 2017/157967 A1 9/2017

OTHER PUBLICATIONS

Extended European Search Report for Application No. 20151319.9 dated May 20, 2020, 10 pages.
(Continued)

*Primary Examiner* — Edward Park
(74) *Attorney, Agent, or Firm* — Alston & Bird LLP

(57) ABSTRACT

The disclosed embodiments relate to a material handling method that generates three-dimensional (3-D) point cloud data based on a field-of-view of an image capturing unit. A first set of cluster areas are extracted from a plurality of cluster areas based on orientation data of the 3-D point cloud data. Further, a two-dimensional depth map is generated based upon the 3-D point cloud data. A candidate region that corresponds to a cluster area from the first set of cluster areas is determined. A ratio of a cross-sectional area of the cluster area and a cross-sectional area of the container is determined that exceeds a first cross-sectional threshold. Accordingly, a classification score of the candidate region is determined when the determined ratio exceeds a first cross-sectional threshold. In response to classifying the candidate region as a region-of-interest, a navigation path in the container that prevents collision with the region-of-interest is defined.

20 Claims, 13 Drawing Sheets

(51) Int. Cl.
*G06T 7/73* (2017.01)
*G06N 20/00* (2019.01)
*G06K 9/62* (2006.01)

(52) U.S. Cl.
CPC ...... *G06T 7/73* (2017.01); *G06T 2207/10028* (2013.01)

(56) References Cited

U.S. PATENT DOCUMENTS

| | | |
|---|---|---|
| 10,346,659 B1 * | 7/2019 | Ahmed .................. G06T 7/136 |
| 2014/0017048 A1 | 1/2014 | Mattern et al. |
| 2015/0371431 A1 * | 12/2015 | Korb .................. G06K 9/00208 |
| | | 382/113 |
| 2017/0140550 A1 | 5/2017 | Zhang et al. |
| 2018/0181817 A1 * | 6/2018 | Yan ...................... G06K 9/6273 |
| 2018/0268220 A1 | 9/2018 | Lee et al. |

OTHER PUBLICATIONS

Communication pursuant to Rules 70(2) and 70a(2) for European Patent Application No. 20151319.9 dated Jul. 27, 2020, 2 pages.

* cited by examiner

MATERIAL HANDLING METHOD, APPARATUS, AND SYSTEM FOR IDENTIFICATION OF A REGION-OF-INTEREST

TECHNOLOGICAL FIELD

Example embodiments of the present disclosure relate generally to material handling systems and, more specifically, to identification of a region-of-interest.

BACKGROUND

In worksites, such as warehouses, the loading and unloading of containers are common operations that may be performed manually by workers and/or assisted by machines that may operate in semi-autonomous and fully autonomous modes. Machines such as conveyor belts, forklift machines, robotic carton loader/unloader, and/or the like may be used to manipulate the products placed in a container, truck, or mobile autonomous vehicle. For machines to operate in a fully autonomous mode, the machine may be required to differentiate between products and identify the locations of products to safely operate within a container.

Applicant has identified many deficiencies and problems associated with existing methods. Through applied effort, ingenuity, and innovation, many of these identified deficiencies and problems have been solved by developing solutions that are in accordance with embodiments of the present disclosure, many examples of which are described in detail herein.

BRIEF SUMMARY

Various embodiments herein relate to methods, apparatuses, and systems that provide increased safety in material handling environments. With reference to the claimed method, a method for material handling may include generating, by an image processing unit, three-dimensional (3-D) point cloud data based on a field-of-view (FOV) of an image capturing unit, and the FOV may include an interior of a container. The method may further include identifying, by the image processing unit, a plurality of cluster areas of the container interior, and extracting, by the image processing unit, a first set of cluster areas from the plurality of cluster areas based on orientation data associated with the 3-D point cloud data. The method may also include generating, by the image processing unit, a two-dimensional (2-D) depth map based upon the 3-D point cloud data, and determining, by the image processing unit, a candidate region of the first set of cluster areas. The candidate region may include a cluster area having a ratio of a cross-sectional area of the cluster area and a cross-sectional area of the container that exceeds a first cross-sectional threshold. The method may further include determining, by a machine learning unit, a classification score of the candidate region, and classifying, by the machine learning unit, the candidate region as a region-of-interest in an instance in which the classification score of the candidate region exceeds a first classification threshold. The method may also include defining, by a processor, a navigation path in the container based on a data set associated with the region-of-interest. The navigation path may be configured to prevent collision with the region-of-interest.

In some instances, generating the 3-D point cloud data may include accumulating 3-D point cloud data generated based on point cloud data of the FOV captured by an image capturing unit positioned on a material handling apparatus, and kinematic data collected based on a movement of an article manipulator of the material handling apparatus during a scanning operation of the FOV. In such an embodiment, the method may further include transforming, by the image processing unit, a first format of the 3-D point cloud data to a second format. The first format may correspond to a light detection and ranging frame and the second format may correspond to a transformed frame compatible with the image processing unit.

In some embodiments, the method further includes pre-processing, by the image processing unit, the 3-D point cloud data. The pre-processing may include removing, by the image processing unit, noise data points from the 3-D point cloud data in the second format, segmenting, by the image processing unit, the 3-D point cloud data from which the noise data points are removed, and determining, by the image processing unit, the plurality of cluster areas based on the segmentation of the 3-D point cloud data.

In some embodiment, the method may include extracting, by the image processing unit, a second set of cluster areas from the plurality of cluster areas based on at least an orientation of the second set of cluster areas with respect to a material handling apparatus, and determining, by the image processing unit, a type of each of the second set of cluster areas of the plurality of cluster areas of the container. The type of each of the second set of cluster areas may correspond to one of a side wall, a floor area, or a ceiling area of the container, and the first set of cluster areas of the plurality of cluster areas may correspond to a back wall and a product wall of the docked container. In such an embodiment, the method may further include obtaining, by the image processing unit, updated 3-D point cloud data. The updated 3-D point cloud data may include 3-D point cloud data from which the second set of cluster areas are clipped.

In some embodiments, the method may further include segmenting, by the image processing unit, the updated 3-D point cloud data, and determining, by the image processing unit, the first set of cluster areas based on the segmentation of the updated 3-D point cloud data. Furthermore, the method may include identifying, by the image processing unit, the candidate region as the cluster area of the first set of cluster areas that is disposed at intersection areas between the first set of cluster areas and the second set of cluster areas where the candidate region defines a 2-D depth map.

In some cases, the method may include converting, by the image processing unit, the updated 3-D point cloud data into a range image, and the generation of the 2-D depth map may be based on the range image. In such an embodiment, the method may further include generating, by the processor, the data set associated with the region-of-interest based on localization of the candidate region, and transmitting, by the processor, the data set associated with the region-of-interest to a programmable logic controller associated with the material handling apparatus.

In some further embodiments, the method may include providing, by the processor, the identified candidate region to a trained single input convolution neural network module, and determining, by the convolution neural network module, a score associated with the identified candidate region. The method may also include classifying, by the convolution neural network module, the identified candidate region as a region-of-interest in an instance in which the classification score exceeds a second classification threshold wherein the region-of-interest is a back wall of the container. Otherwise, the method may include classifying, by the convolution neural network module, the identified candidate region as a product wall in an instance in which the classification score fails to exceed the second classification threshold.

In other embodiments, the method may include defining, by the processor, a navigation path in the container based on a data set associated with the classified region-of-interest in an instance in which the classification score fails to exceed the second classification threshold, and controlling, by an article manipulation unit, an article manipulator to follow the navigation path to manipulate a plurality of articles placed in the container in an area corresponding to the product wall.

In some cases, the classification of the candidate region includes obtaining, by the machine learning unit, a plurality of key interest points in the candidate region. In an instance in which a count of the plurality of key interest exceeds a second classification threshold, the candidate region may correspond to the region-of-interest. In an instance in which the count of the plurality of key interest points fails to exceed the defined value, the candidate region may not correspond to the region-of-interest.

In some embodiments, the classification of the candidate region further includes determining, by the machine learning unit, a plurality of key descriptors based on the plurality of key interest points and determining, by the machine learning unit, a distribution of the plurality of key descriptors. The method may further include generating, by the machine learning unit, a feature vector based on the distribution of the plurality of key descriptors.

In some cases, the classification of the candidate region further includes training, by the machine learning unit, a machine learning model to provide the classification score, and classifying, by the machine learning unit, the candidate region as a product wall in an instance in which the classification score of the feature vector fails to exceed the first classification threshold.

In some embodiments, the method includes controlling, by an article manipulation unit, an article manipulator to follow the navigation path and manipulate a plurality of articles placed in the container. In other embodiments, the method includes localizing, by the image processing unit, the candidate region as the region-of-interest in an instance in which the difference between the cross-sectional area of the container and the cross-sectional area of the cluster area fails to exceed the first cross-sectional threshold.

The above summary is provided merely for purposes of providing an overview of one or more example embodiments described herein to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
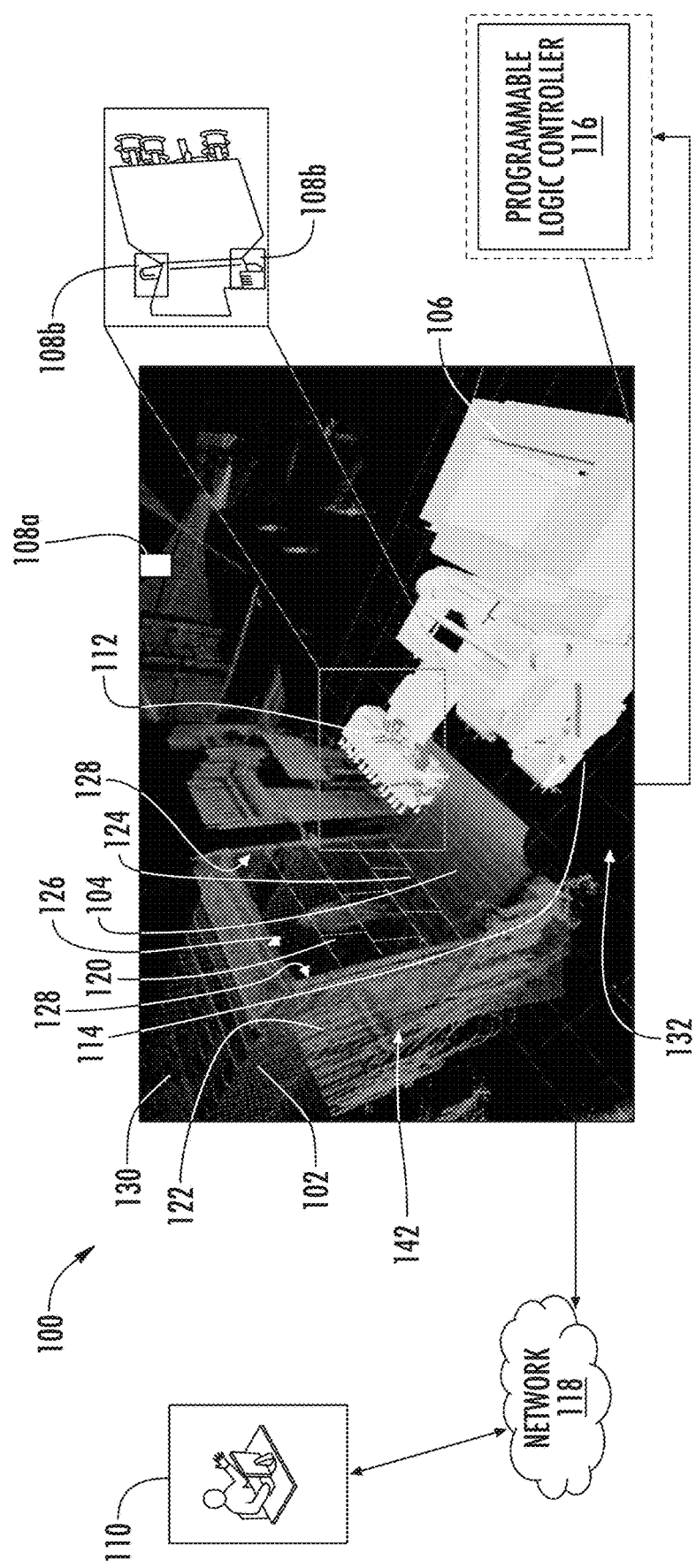
FIG. 1 illustrates an image of a worksite for use with one or more embodiments.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

When a machine, such as a truck unloader, operates in a fully autonomous mode in a worksite (e.g., unloading products from a docked container), various devices and components installed therein may be configured to determine a navigation path (e.g., ingress, egress, etc.) to pick products from a product wall in the container of the truck. These systems may localize the products inside the container and utilize robotic arm(s) and manipulators in order to perform loading and unloading operations inside the container. For an efficient operation, the machines may be required to differentiate between the products that need to be picked and various regions of the container that need to be avoided. In some instances, a false positive may occur in which the system misinterprets a wall of the container for a wall of products. In these instances, the manipulators may attempt pick a part of the container, thereby leading to damage to the container and the manipulator, creating liability issues, and reducing the performance of the system.

In order to address these problems and others, the present disclosure uses 3-D vision data to classify region-of-interests (such as a back container wall) within the container. Once, a region-of-interest is identified, a navigation path in the container is defined. In this way, dimensioning of the container may be accurately determined to prevent possible collisions between an article manipulator and walls of the container.

It is to be understood that terms such as front, back, inside, outside, and the like are words of convenience and are not to be construed as limiting terms. Terminology used in this patent application is not meant to be limiting insofar as devices described herein, or portions thereof, may be attached or utilized in other orientations. References made to particular examples and implementations are for illustrative purposes and are not intended to limit the scope of the invention or the claims. Having described an example embodiment at a high level, the design of the various devices performing various example operations is provided below.

FIG. 1 illustrates an image of a worksite 100, in accordance with one or more example embodiments. The worksite 100 may correspond to a defined area where an operation, such as loading and/or unloading of products and storage of the products, may be performed. Some examples of the worksite 100 may include, but are not limited to, a warehouse, a retail outlet, and/or the like. The worksite 100 may include a container 102, one or more transitional components 104, a material handling apparatus 106, one or more image-capturing devices 108a and 108b, and a remote control center 110. The material handling apparatus 106 may further include an article manipulator 112, a plurality of traction devices 114, and a programmable logic controller 116. The one or more image-capturing devices 108a and 108b, the material handling apparatus 106, and the remote control center 110 may be communicatively coupled with each other through a network 118.

In some embodiments, the programmable logic controller 116 may include a plurality of components, such as a processor, a plurality of actuators, an image processing unit, a machine learning unit, and the like, as described with reference to FIG. 2. In some embodiments, one or more of these components may be integrated within the programmable logic controller 116. In other embodiments, the plurality of components may be separate from the programmable logic controller 116 and may be communicatively coupled with the programmable logic controller 116.

The container 102 may correspond to a storage unit that is adapted to store a plurality of products that may be arranged in any number of configurations at any orientation. As shown in FIG. 1, however, products may be stored as a flushed product wall 120. In an example embodiment, the container 102 may be a trailer of a vehicle (not shown), such as a truck that is utilized for transportation of the plurality of products. The container 102 may include one or more regions, such as one or more doors 122, a floor 124, a ceiling 126, sidewalls 128, and a back wall 130. For loading and unloading of the plurality of products stored as a flushed product wall 120, the container 102 may be docked in the worksite 100 at a first location in the worksite 100. After docking of the container 102, the one or more transitional components 104 may be positioned in such a manner that the one or more transitional components 104 couple with the floor 124 of the container 102 and a ground surface 132 of the worksite 100.

In an example embodiment, the one or more transitional components 104 may correspond to objects that are adapted to couple the ground surface 132 of the worksite 100 with the floor 124 of the container 102, such that a traversal path ingress and egress to and from the container 102 is formed. In an example embodiment, an orientation of the one or more transitional components 104, with respect to the ground surface 132 of the worksite 100, may be adjusted in accordance with an orientation of the floor 124 of the container 102 with respect to the ground surface 132. For example, if an elevation of the floor 124 of the container 102 is offset with regard to an elevation of the ground surface 132 of the worksite 100, a pitch of the one or more transitional components 104 may be adjusted such that the one or more transitional components 104 suitably couple to both the floor 124 and the ground surface 132. In some embodiments, in order to allow adjustment in the orientation of the one or more transitional components 104, the one or more transitional components 104 may be coupled to one or more actuators (not shown), such as hydraulic cylinders, motors, and/or the like. The one or more actuators may be actuated to allow the modification of the orientation of the one or more transitional components 104. Some examples of the one or more transitional components 104 may include, but are not limited to, a ramp and a dock leveler.

The material handling apparatus 106 may include the programmable logic controller 116 that is adapted to control the operation of one or more components of the material handling apparatus 106. For example, the programmable logic controller 116 may be adapted to control the operation of the article manipulator 112 and the plurality of traction devices 114. In some embodiments, the image-capturing device 108b is positioned on the material handling apparatus 106 such that the programmable logic controller 116 may be further adapted to control the operation of the image-capturing device 108b. The programmable logic controller 116 may be adapted to instruct the image-capturing device 108b to capture the FOV associated with the container 102. Based on the captured FOV, the image-capturing device 108b may be configured to generate 3-D point cloud data of the container 102, such that the 3-D point cloud data includes the point cloud of the container 102. Thereafter, the programmable logic controller 116 may be adapted to control the operation of the material handling apparatus 106 based on the generated 3-D point cloud data. Controlling the operation of the material handling apparatus 106 is described hereafter with reference to FIGS. 9A-9F. Some examples of the material handling apparatus 106 may include, but are not limited to, a robotic carton unloader, a forklift machine, and/or any other machine that is adapted to load and unload products to and from the container 102.

The programmable logic controller 116 may be further adapted to process the 3-D point cloud data generated by the image-capturing device 108b by performing various operations. Examples of such operation may include, but are not limited to, segmentation, clustering, generating a 2-D depth map, feature classification, and the like.

The one or more image-capturing devices 108a and 108b may be positioned at defined locations in the worksite 100. For example, the image-capturing device 108a may be positioned on a ceiling (not shown) of the worksite 100. Alternatively or additionally, the image-capturing device 108b may be positioned on the material handling apparatus 106. More particularly, the image-capturing device 108b may be positioned on the article manipulator 112 of the material handling apparatus 106. The one or more image-capturing devices 108a and 108b may include one or more image sensors that are adapted to capture a field-of-view (FOV) associated with the container 102. In some embodiments, each of the one or more image-capturing devices 108a and 108b may include two-dimensional (2-D) Laser Imaging Detection and Ranging (LIDAR) devices. These 2-D LIDAR devices may emit multiple pulses in rapid succession, and the direction of these emissions may be sequentially varied. Each distance measurement may be considered a pixel, and a collection of pixels emitted and captured in rapid succession (i.e., a "point cloud") may be rendered as an image or analyzed, such as for detecting obstacles. Image viewers associated with the image-capturing device 108b and/or the programmable logic controller 116 may be configured to manipulate the point clouds to give the appearance of a 3-D point cloud, rendered as a 3-D image.

In some embodiments, each of the point clouds generated by the one or more image-capturing devices 108a and 108b comprises a plurality of points that may be utilized to represent an object in the 3-D image. For example, the plurality of points, (e.g., 3-D point cloud data) may be utilized to represent a container 102 in the 3-D image, as illustrated in FIG. 1. Each point in the plurality of points may include information pertaining to a coordinate of the point and an orientation of the point associated with one or more objects, with respect to the material handling apparatus 106. In an example embodiment, the orientation of a point in the 3-D point cloud may correspond to a pitch and a yaw of the point associated with the one or more objects. In an example embodiment, the coordinate of the point in the 3-D point cloud may be deterministic of a position of the point in the 3-D image. Further, the coordinate of the point may be deterministic of a depth of the point with respect to the image-capturing device 108b. After the capture of the 3-D point cloud, the one or more image-capturing devices 108a and 108b may be adapted to transmit the captured 3-D point cloud to the programmable logic controller 116 of the material handling apparatus 106. Apart from the 2-D LIDAR, some examples of the one or more image-capturing devices 108a and 108b may include, but are not limited to, a camera, a stereo camera, a 3-D LIDAR, and/or the like.

The remote control center 110 may include one or more computing devices that may enable a user or administrator to monitor various operations performed in the worksite 100. In an example embodiment, the remote control center 110 may be communicatively coupled to each of the one or more image-capturing devices 108a and 108b, and the material handling apparatus 106 through the network 118. In some embodiments, the remote control center 110 may include an application server that is communicatively coupled to the one or more image-capturing devices 108a and 108b and the material handling apparatus 106 through the network 118. The application server may be adapted to monitor and control the operations of the one or more image-capturing devices 108a and 108b and the material handling apparatus 106. In some embodiments, the functionalities of the programmable logic controller 116 of the material handling apparatus 106, may be implemented in the application server. In such an embodiment, the application server may be adapted to remotely control the operations of the material handling apparatus 106. Further, in such an embodiment, the need for the programmable logic controller 116 in the material handling apparatus 106 may not be required. Some examples of the application server may include, but are not limited to, a Moss' application server, Java™ Application server, Apache Tomcat™ server, IBM Websphere™, and/or the like.

The network 118 may correspond to a medium through which content and messages flow between various devices and/or machines in the worksite 100 (e.g., the one or more image-capturing devices 108a and 108b, and material handling apparatus 106). Examples of the network 118 may include, but are not limited to, a Wireless Fidelity (Wi-Fi) network, a Wireless Area Network (WAN), a Local Area Network (LAN), or a Metropolitan Area Network (MAN). Various devices and/or machines in the worksite 100 can connect to the network 118 in accordance with various wired and wireless communication protocols such as, for example, Transmission Control Protocol and Internet Protocol (TCP/IP), User Datagram Protocol (UDP), and 2G, 3G, 4G, or 5G communication protocols.

In operation, the container 102 may be docked in the worksite 100 at the first location. In an example embodiment, the first location may correspond to a gate (depicted by 142) in the worksite 100 through which, at least a section of the container 102 is received. For example, during the docking of the container 102 in the worksite 100, the one or more doors 122 of the container 102 are received through the gate 142. While described and illustrated herein with reference to the container 102 that is docked in the worksite 100, the present disclosure contemplates that the methods, systems, and apparatuses described herein may be used in any environment in order to prevent undesired collisions with objects.

Following docking of the container 102 in the worksite 100, the material handling apparatus 106 may be positioned at a second location (e.g., second location 140) in the worksite 100. Thereafter, the one or more image-capturing devices 108a and 108b may be adapted to capture the FOV of the worksite 100 and generate 3-D point cloud data. In a first scenario where the image-capturing device 108a is utilized to generate the 3-D point cloud data, the 3-D point cloud data may include the image of the material handling apparatus 106 and the image of the container 102. In a second scenario where the image-capturing device 108b is utilized to generate the 3-D point cloud data, the 3-D point cloud data may include the image of the container 102.

The image-processing unit 210 may be configured to generate three-dimensional (3-D) point cloud data based on an FOV of the image-capturing device 108b. The FOV may comprise the interior of the container 102 that includes the product wall 120, the floor 124, the ceiling 126, the sidewalls 128, and the back wall 130. The programmable logic controller 116 may be configured to extract a first set of cluster areas from a plurality of cluster areas based on orientation data associated with the plurality of cluster areas.

The first set of cluster areas may correspond to the product wall 120, the floor 124, the ceiling 126, and the back wall 130, of the plurality of regions interior to the container 102. The programmable logic controller 116 may be further configured to generate a 2-D depth map comprising a candidate region, such as the product wall 120 or the back wall 130. The candidate region may correspond to a cluster area from the first set of cluster areas having a ratio of a cross-sectional area of the cluster area and a cross-sectional area of the container that exceeds a first cross-sectional threshold. As would be evident to one of ordinary skill in the art in light of the present disclosure, as the ratio between cross-sectional areas (i.e., the ratio between the cluster area and the container) exceeds the first cross-sectional threshold, it may be more difficult for traditional systems to distinguish between a flush wall of product 120 and a wall of the container 130. Conversely, as the ratio between cross-sectional areas fails to exceed the first cross-sectional threshold, it may be clear that, given the size disparity, the cluster area represents a product or wall of product 120 (e.g., such as a single package located in the container). Furthermore, while described herein with reference to a ratio that exceeds the first cross-sectional threshold, the present disclosure contemplates that any calculation that achieves the same comparative result may be used (e.g., a ratio of the cross-sectional area of the container to the cross-sectional area of the cluster area).

A machine learning unit (described with reference to FIG. 2) may be configured to determine a classification score of the candidate region. In an instance in which the classification score of the candidate region exceeds a first classification threshold, the machine learning unit may be configured to classify the candidate region as a region-of-interest (e.g., the back wall 130). Accordingly, the programmable logic controller 116 may be configured to define a navigation path in the container 102 based on a data set associated with the region-of-interest of the container 102. This navigation path may be configured to prevent collision with the region-of-interest (e.g., the back wall 130). These operations are described in detail with reference to FIGS. 9A-9F.

Figure 2:
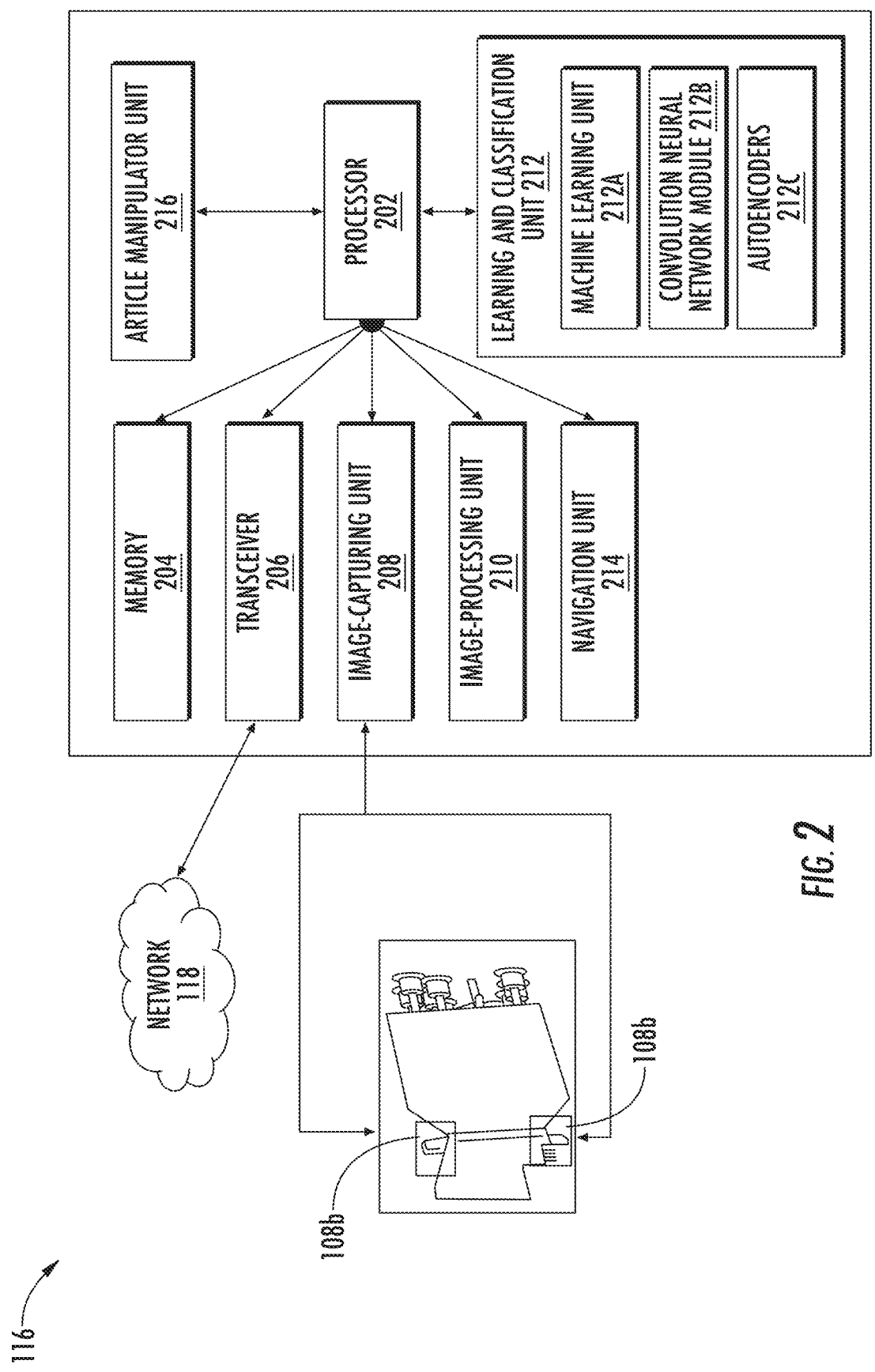
FIG. 2 illustrates a block diagram of the programmable logic controller in accordance with one or more embodiments.

FIG. 2 illustrates a block diagram of the programmable logic controller 116, in accordance with one or more example embodiments. FIG. 2 is explained in conjunction with various illustrations depicted in FIGS. 3-9F, in accordance with one or more example embodiments. The programmable logic controller 116 may include a processor 202, a memory 204, a transceiver 206, an image-capturing unit 208, an image-processing unit 210, a learning and classification unit 212 (including a machine learning unit 212A, a convolution neural network module 212B, and autoencoder(s) 212C), a navigation unit 214, and an article manipulator unit 216. The processor 202 may be communicatively coupled to each of the memory 204, the transceiver 206, the image-processing unit 210, the learning and classification unit 212, the navigation unit 214, and the article manipulator unit 216.

The processor 202 may include suitable logic, circuitry, and/or interfaces that are operable to execute one or more instructions stored in the memory 204 to perform a defined operation. The processor 202 may be implemented using one or more processor technologies. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 may include suitable logic, circuitry, and/or interfaces that are adapted to store a set of instructions that are executable by the processor 202 to perform the defined operation. Some of the commonly known memory implementations include, but are not limited to, a random access memory (RAM), a read only memory (ROM), a hard disk drive (HDD), and a secure digital (SD) card.

The transceiver 206 may correspond to a communication interface that facilitates transmission and reception of messages and data to and from various devices operating in the worksite 100 through the network 118. Examples of the transceiver 206 may include, but are not limited to, an antenna, an Ethernet port, a USB port, a serial port, or any other port that can be adapted to receive and transmit data. The transceiver 206 transmits and receives data and/or messages in accordance with various communication protocols, such as for example, I2C, TCP/IP, UDP, and 2G, 3G, 4G, or 5G communication protocols.

Figure 3:
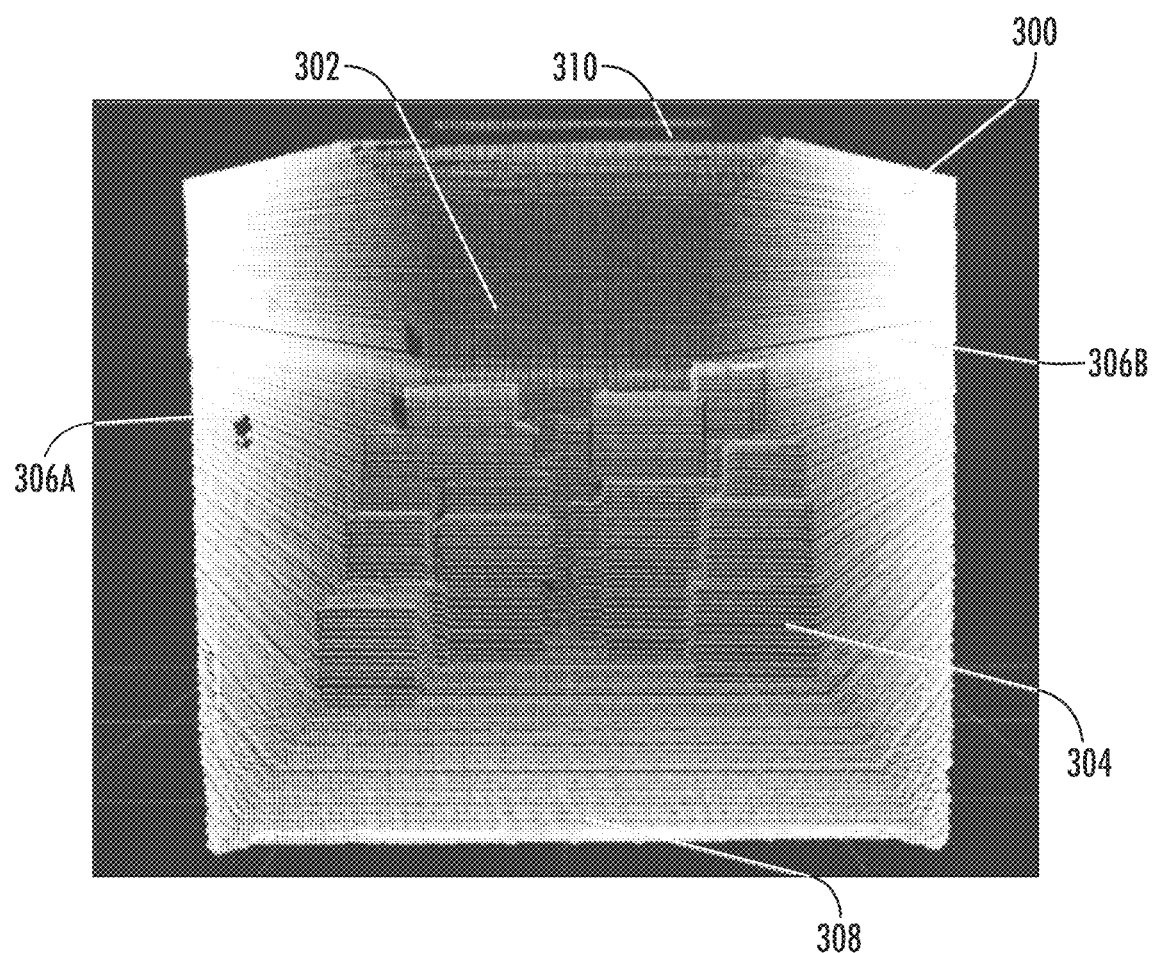
FIG. 3 illustrates an image of 3-D point cloud data in accordance with one or more embodiments described herein.

The image-capturing unit 208 may include suitable logic and circuitry that may be configured to control the operation of the one or more image-capturing devices 108a and 108b. For example, the image-capturing unit 208 may instruct the one or more image-capturing devices 108a and 108b to capture the FOV of the container 102, such as a first set of regions and a second set of regions, interior to the container 102. Examples of the first set of regions may include the product wall 120, the floor 124, the ceiling 126, and the back wall 130 of the container 102, and the second set of regions may include the side walls 128 of the container 102. Based on the captured FOV, the image-capturing unit 208 may be configured to generate 3-D point cloud data. In an example embodiment, 3-D point cloud data 300 is illustrated in FIG. 3. The 3-D point cloud data 300 includes a first set of point cloud data, such as a back wall point cloud data 302 and a product wall point cloud data 304, and a second set of point cloud data, such as side wall point cloud data 306A and 306B, floor point cloud data 308, and ceiling point cloud data 310.

The image-capturing unit 208 may additionally instruct the article manipulator unit 216 to actuate the one or more components of the material handling apparatus 106 during capturing of the FOV. Further, the image-capturing unit 208 may correlate kinematic data associated with movement of the one or more components of the material handling apparatus 106 with the 3-D point cloud data (generated by the image-capturing device 108b). The capturing of the 3-D point cloud data is described later in conjunction with FIG. 3. The image-capturing unit 208 may be implemented using one or more technologies such as, but not limited to, a field programmable gate array (FPGA), an application specific integrated circuit (ASIC), and the like.

The image-processing unit 210 may include suitable logic and circuitry that may enable the image-processing unit 210 to process the 3-D point cloud data. In an example embodiment, the image-processing unit 210 may receive the 3-D point cloud data from the image-capturing unit 208. Further, the image-processing unit 210 may be adapted to perform various image processing operations, for example, segmenting, clustering, determining 2-D depth maps, and the like, on the 3-D point cloud data. For example, the image-processing unit 210 may generate a first set of cluster areas that correspond to the back wall 130 or the product wall 120, from a plurality of cluster areas based on orientation data associated with the plurality of cluster areas (e.g. orientation data of the 3-D point cloud data). The image-processing unit 210 may be further configured to generate a two-dimensional (2-D) depth map comprising a candidate region. The image-processing unit 210 may be further configured to transform a first format that corresponds to a light detection and ranging frame of the 3-D point cloud data to a second format that corresponds to a transformed frame compatible with the image-processing unit 210.

Figure 4:
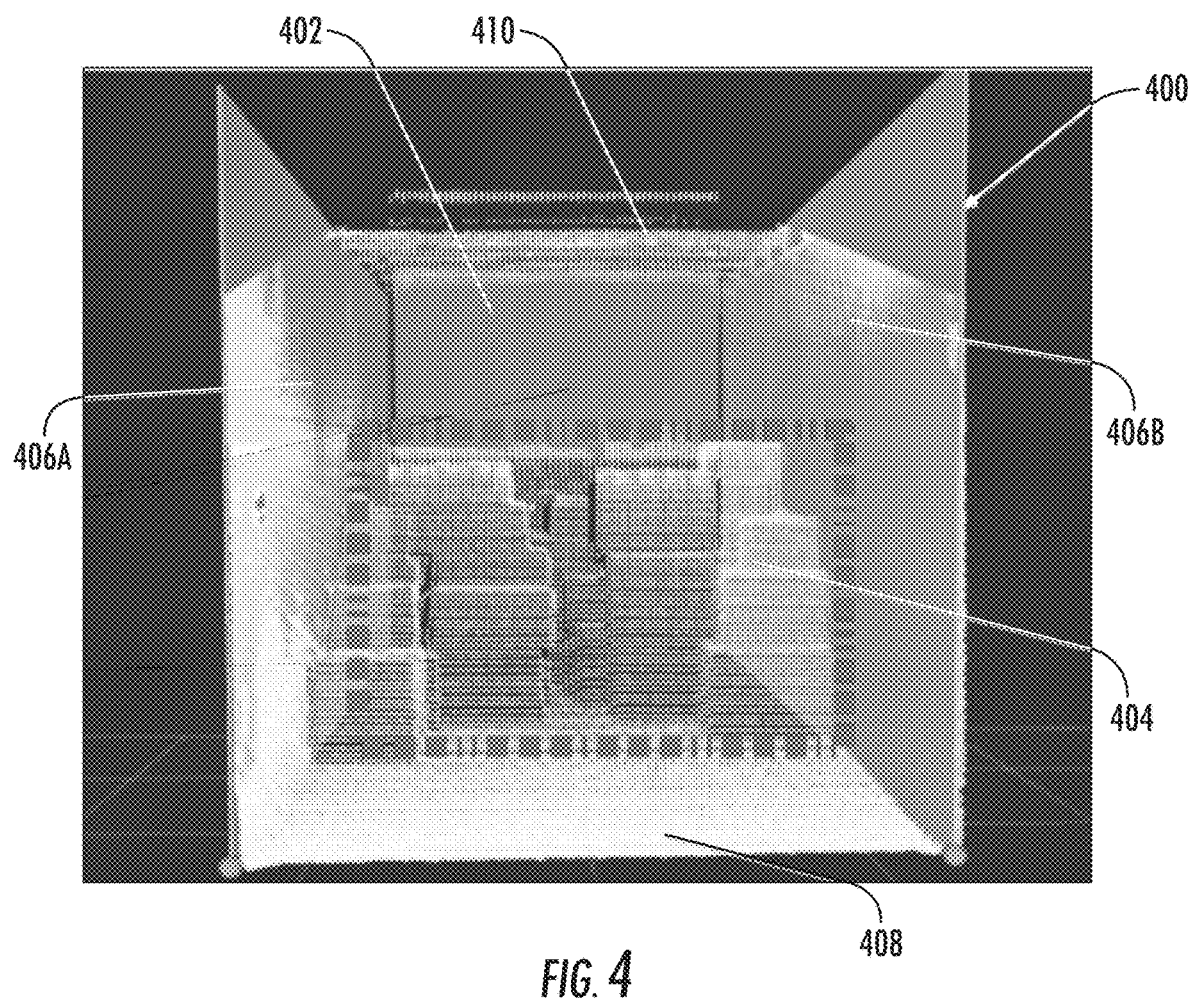
FIG. 4 illustrates an image of transformed 3-D point cloud data in a second format in accordance with one or more embodiments described herein.

In an example embodiment, a transformed 3-D point cloud data 400 in the second format is illustrated in FIG. 4. The transformed 3-D point cloud data 400 includes a first set of transformed point cloud data, such as a back wall point cloud data 402 and a product wall point cloud data 404, a floor point cloud data 408 and ceiling point cloud data 410, and a second set of transformed point cloud data, such as side wall point cloud data 406A and 406B.

The image-processing unit 210 may be further configured to remove noise data points from the 3-D point cloud data in the second format, and segment the noise-free 3-D point cloud data. Further, the image-processing unit 210 may determine the plurality of cluster areas based on the segmentation of the 3-D point cloud data, and identify a second set of cluster areas from the plurality of cluster areas based on at least an orientation of the second set of cluster areas with respect to the material handling apparatus 106. The image-processing unit 210 may further determine a type of each of the second set of cluster areas (e.g., side walls 128 of the plurality of cluster areas of the container 102).

In an example embodiment, the image-processing unit 210 may obtain an updated 3-D point cloud data from the 3-D point cloud data based on clipping of the identified second set of cluster areas from the plurality of cluster areas.

Figure 5:
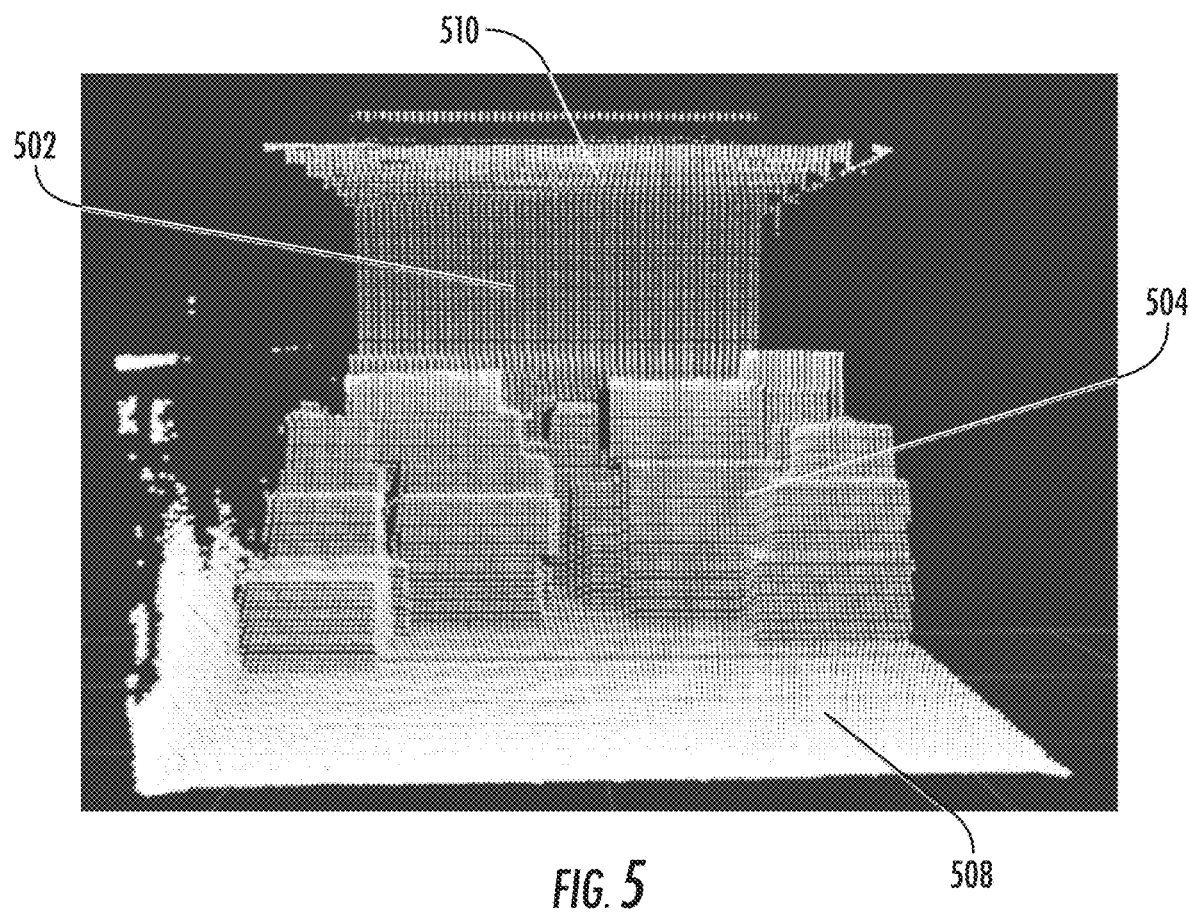
FIG. 5 illustrates an image of updated 3-D point cloud data in accordance with one or more embodiments described herein.

With reference to FIG. 5, an updated 3-D point cloud data 500 is illustrated. The updated 3-D point cloud data 500, based on the clipping of the second set of cluster areas, includes a first set of updated point cloud data, such as a back wall point cloud data 502 and a product wall point cloud data 504, a floor point cloud data 508, and a ceiling point cloud data 510. Side wall point cloud data are identified from the second set of cluster areas and clipped. Thereafter, the image-processing unit 210 may segment the updated 3-D point cloud data obtained from the 3-D point cloud data of the identified second set of cluster areas, and determine the first set of cluster areas based on the segmentation of the updated 3-D point cloud data.

Figure 6A:
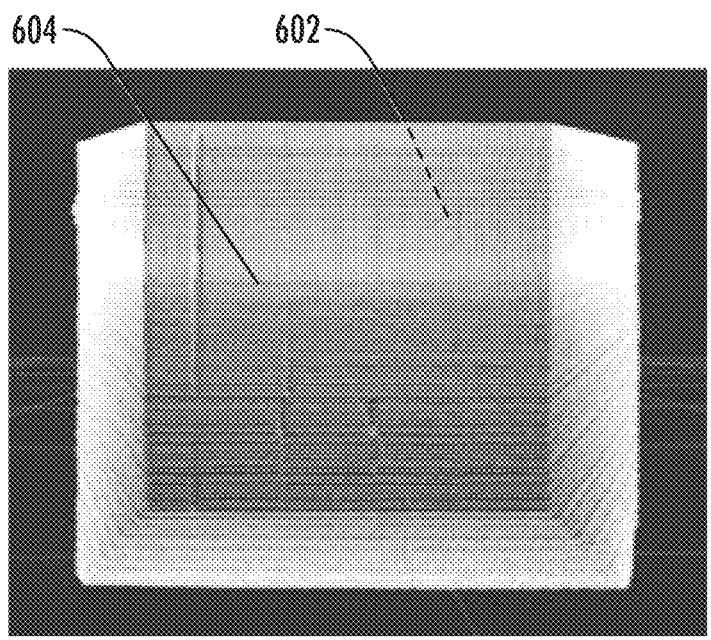
FIG. 6A illustrates an image of a candidate region in accordance with one or more embodiments described herein.

In an example embodiment, the image-processing unit 210 may identify a candidate region from the first set of cluster areas that is disposed at an intersection area between the first set of cluster areas and the second set of cluster areas. The candidate region may correspond to a cluster area from the first set of cluster areas. In an example embodiment, a candidate region is illustrated in FIG. 6A. The candidate region corresponds to flushed product wall point cloud data 604, for example, in front of the back wall point cloud data 602 or only the back wall point cloud data 602.

Figure 6B:
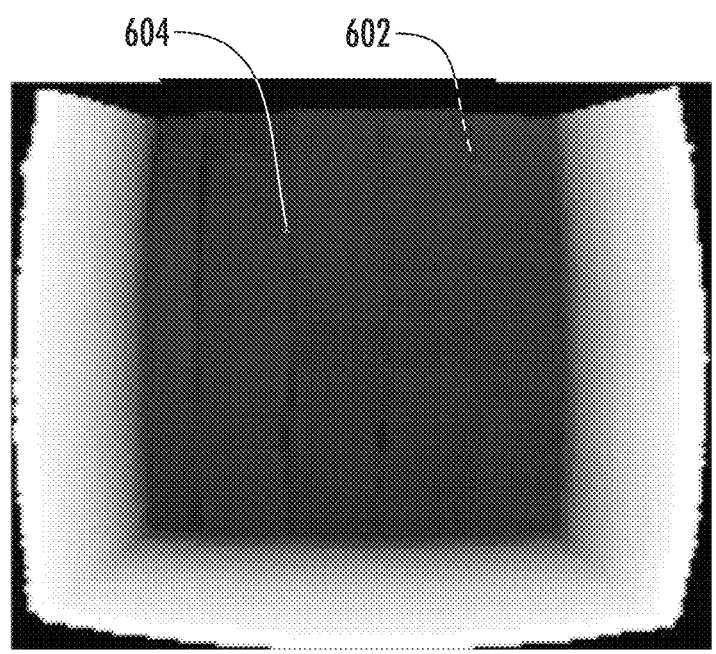
FIG. 6B illustrates an image of a 2-D depth map in accordance with one or more embodiments described herein.

In an example embodiment, a ratio of the cross-sectional area of the candidate region (e.g., the cross-sectional area of the candidate region) and a cross-sectional area of the container 102 exceeds the first cross-sectional threshold. In such embodiment, the image-processing unit 210 may localize the candidate region as the region-of-interest (e.g., the back wall 130 or product wall 120) for further processing as described hereafter. For example, a data set associated with the region-of-interest is generated and the data set may be transmitted to the programmable logic controller 116 associated with the material handling apparatus 106. In an instance in which the ratio of the cross-sectional area of the candidate region (e.g., the cross-sectional area of the candidate region) and cross-sectional area of the container fails to exceed the first cross-sectional threshold, the image-processing unit 210 may localize the candidate region as the product wall 120. In an instance in which the ratio of the cross-sectional area of the candidate region and the cross-sectional area of the container 102 exceeds the first cross-sectional threshold, the image-processing unit 210 may convert the updated 3-D point cloud data, as shown in FIG. 6A, into a range image. Based on the range image, the image-processing unit 210 may generate a 2-D depth map, as shown in FIG. 6B. Following this conversion, the system may determine if the candidate region corresponds to the back wall 130 or the product wall 120 (e.g., the cross-sectional areas for the candidate region and the container are too close in size). The determination of the back wall 130 or the product wall 120 may be based on a back wall detection algorithm, as described with reference to FIG. 7. In some embodiments, the determination of the back wall 130 or the product wall 120 may be based on one or more classification algorithms, as described in FIGS. 8A to 8C, performed by the learning and classification unit 212.

Figure 7:
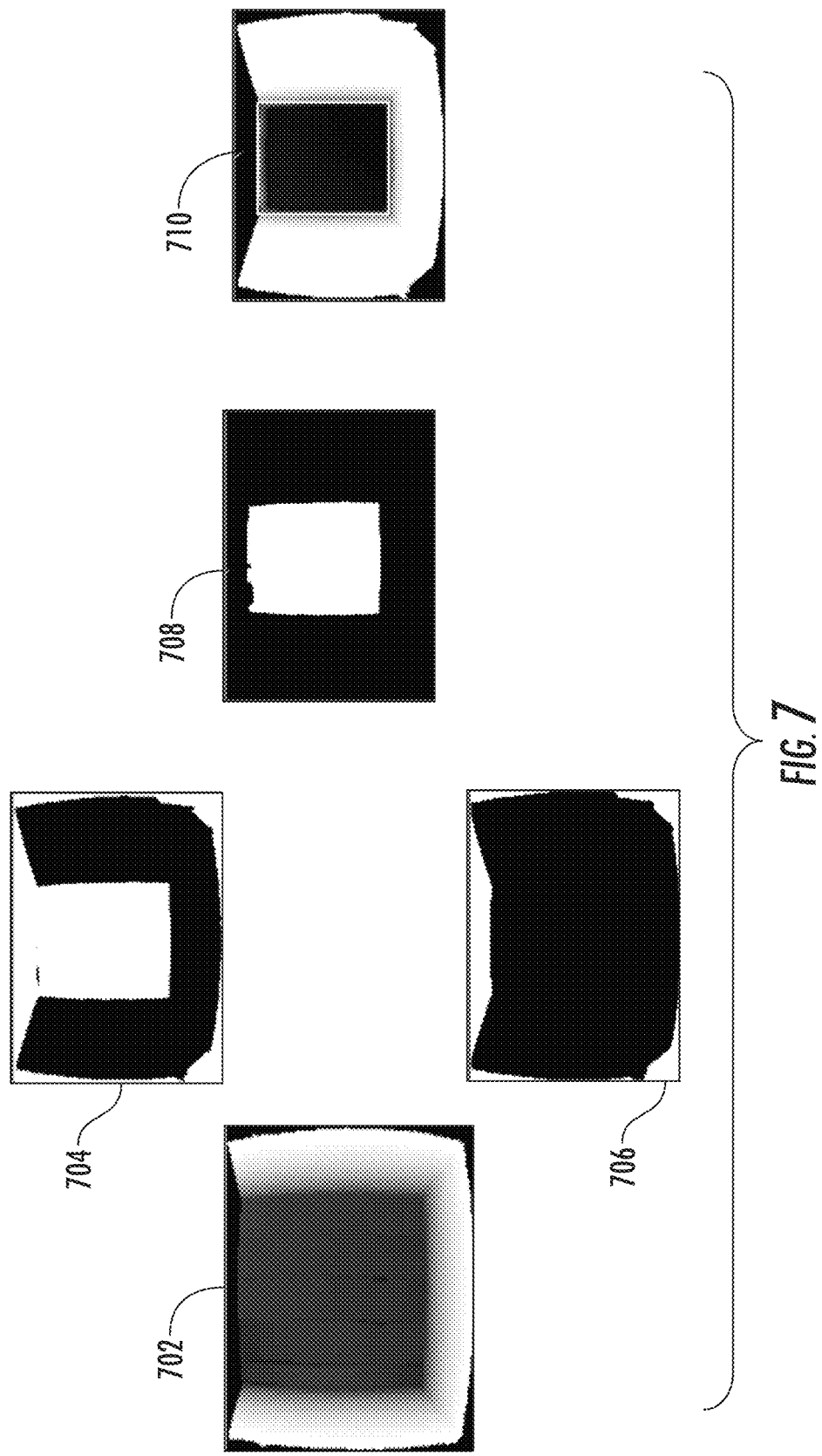
FIG. 7 illustrates images for back wall detection in accordance with one or more embodiments described herein.

Referring to FIG. 7, an input image 702 (similar to the 2-D depth map as shown in FIG. 6B) is illustrated. Additionally, two binary thresholds that are applied on the on the input image 702 (i.e., the 2-D depth map) resulting in two masks 704 and 706 are shown. A mathematical operation, such as an XOR operation, is performed on the two masks 704 and 706 to generate a resultant mask 708 based on a morphological erosion due to which the value of the output pixel is the minimum value of all the pixels in the input pixel's neighborhood. In a binary image, if any of the pixels is set to 0, the output pixel is set to 0. Further, blob analysis is performed on the resultant mask 708 based on analysis of consistent image regions such that inspected objects are clearly discernible from the background. Max area blob 710 may be filtered to exclude false positives and to identify a region-of-interest.

Max area blob 710 may also be fed to a back wall detection module in the image-processing unit 210 that generates a probabilistic score (using a classifier). Based on the probabilistic score, the back wall detection module may determine whether the max area blob 710 corresponds to the back wall 130. The image-processing unit 210 may be implemented using one or more technologies such as, but not limited to, FPGA, ASIC, and the like The learning and classification unit 212 may include suitable logic and circuitry that may be configured to construct a classification model based on the given training data points before receiving actual data points for classification. Once the data points are received for classification, the learning and classification unit 212 may be configured to predict a category, target, or label of the received data points. The learning and classification unit 212 may include the machine learning unit 212A, the convolution neural network module 212B, and the autoencoder 212C.

In an example embodiment, the machine learning unit 212A may be configured to obtain a plurality of key interest points in a candidate region. A key interest point in an image may refer to a pixel that has a well-defined position and may be robustly detected (via any of the processes described herein). The key interest point has high local information content and is ideally repeatable between different images. Location information of the key interest points may be beneficial in deciding whether the candidate region is flat, well organized, and suitably stacked. In an example embodiment, the machine learning unit 212A may be configured to determine the flat, well organized, and suitably stacked candidate region in a column fashion for use with the location information. In an instance in which a count of the plurality of key interest points exceeds a defined value, the candidate region may correspond to a region-of-interest (e.g., the back wall 130) of the container 102. In another instance in which the count of the plurality of key interest points fails to exceed the defined value, the candidate region may not correspond to the region-of-interest. The machine learning unit 212A may be further configured to determine a plurality of key descriptors based on the plurality of key interest points.

Figure 8A:
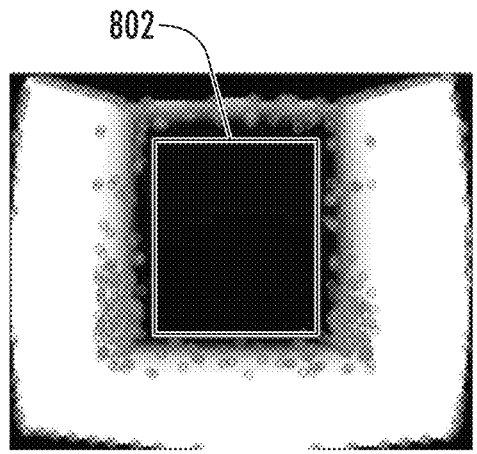
FIG. 8A illustrates a plurality of key descriptors determined to be outside of a designated area in accordance with one or more embodiments described herein.
Figure 8B:
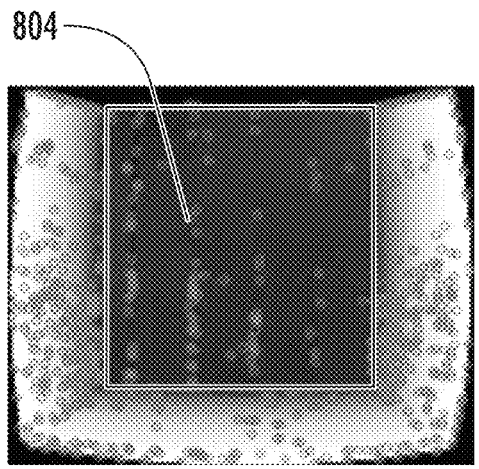
FIG. 8B illustrates plurality of key descriptors determined to be inside of a designated area in accordance with one or more embodiments described herein.

In some embodiments, as illustrated in FIG. 8A, a plurality of key descriptors may be determined to be outside a designated area 802. Such an embodiment may correspond to a scenario when the 2-D image corresponds to the back wall 130. In another example embodiment, as illustrated in FIG. 8B, a plurality of key descriptors 804 may be determined to be inside the designated area 802. Such an embodiment may correspond to a scenario in which the 2-D image corresponds to the flushed product wall 120.

Figure 8C:
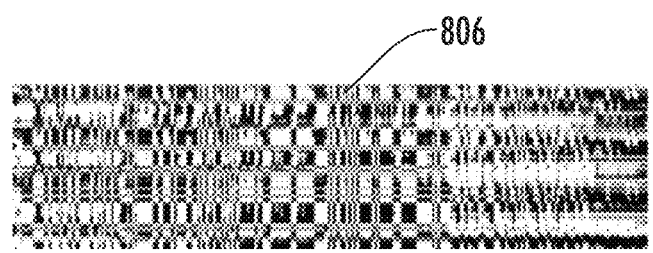
FIG. 8C illustrates extracted features in accordance with one or more embodiments described herein.

The machine learning unit 212A may be further configured to determine a distribution of the plurality of key descriptors 804. Based on the distribution of the plurality of key descriptors 804, the machine learning unit 212A may be configured to generate a feature vector. Features 806 corresponding to the feature vector are illustrated in FIG. 8C.

The machine learning unit 212A may be further configured to train a machine learning model to provide the classification score, and classify the candidate region as the back wall 130, in an instance in which the classification score of the feature vector exceeds the first classification threshold. In another instance in which the classification score of the feature vector fails to exceed the first classification threshold, the machine learning unit 212A may be further configured to classify the candidate region as the product wall 120.

In another embodiment, the convolution neural network module 212B (e.g., a trained single input convolution neural network module), may be configured to receive the identified candidate region and determine a classification score associated with the identified candidate region. The classification score may be a class score (e.g., the back wall score) that may have a probability between zero (0) and one (1) (i.e., closer to one is more accurate). When an input data, such as a point cloud, an image, or other such format, is presented to the trained convolution neural network module 212B, the convolution neural network module 212B outputs a class score. For example, if a positive back wall data is provided as input, the convolution neural network module 212B may provide a score of 1.0 indicative of an ideal case. The convolution neural network module 212B may be configured to classify the identified candidate region as a region-of-interest (e.g., the back wall 130) in an instance in which the classification score exceeds a second classification threshold. The convolution neural network module 212B may be further configured to classify the identified candidate region as the product wall 120 in an instance in which the classification score fails to exceed the second classification threshold.

In another embodiment, the autoencoder 212C may be configured to extract features from the 3-D point cloud data. In certain instances, the autoencoder 212C may overcome any noise in the 3-D point cloud data by providing more differentiation between box surfaces and edges. Such differentiation may facilitate an increase in the performance of the key point extractors, resulting in improved classification. In other instances, the autoencoder 212C may be directly used as feature extractor of the back wall candidates.

The navigation unit 214 may include suitable logic and circuitry that may be configured to determine a first navigation path in the container 102 based on a data set associated with the classified region-of-interest of the container 102 in an instance in which the candidate region is identified as the region-of-interest. Further, the navigation unit 214 may be adapted to store the data pertaining to the first navigation path in the memory 204. The navigation unit 214 may be implemented using one or more technologies, such as, but not limited to, FPGA, ASIC, and the like.

The article manipulator unit 216 may include suitable logic and circuitry that may be configured to control the operation of the article manipulator 112 of the material handling apparatus 106 to manipulate a plurality of articles placed in the container 102. The plurality of articles may be placed in an area corresponding to the product wall in instances in which the candidate region is identified as the product wall 120. In various embodiments, the article manipulator unit 216 may operate the article manipulator 112 according to stored instructions that allow the article manipulator 112 to pick a product of the plurality of products (stored in the container 102) and place the picked product at a location in the worksite 100. Additionally, the article manipulator unit 216 may be adapted to record kinematic data pertaining to the movement of the article manipulator 112 with respect to the container 102. Further, the article manipulator unit 216 may be adapted to store the kinematic data pertaining to the movement of the article manipulator 112 in the memory 204. The article manipulator unit 216 may be implemented using one or more technologies such as, but not limited to, FPGA, ASIC, and the like.

FIGS. 9A-9F are flow diagrams illustrating example methods for material handling apparatus 106, in accordance with an embodiment described herein. FIGS. 9A-9F are described in conjunction with FIGS. 1-8C.

It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described herein may be embodied by computer program instructions. In this regard, the computer program instructions which embody the described procedures may be stored by the memory 204 of the material handling apparatus 106 employing an embodiment of the present disclosure and executed by a processor in the material handling apparatus 106.

As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a specific manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 9A-9F, when executed, convert a computer or processing circuitry into a specific machine configured to perform an example embodiment of the present invention. Accordingly, the operations of FIGS. 9A-9F define algorithms for configuring a computer or processor, to perform an example embodiment. In some cases, a general-purpose computer may be provided with an instance of the processor which performs the algorithms of FIGS. 9A-9F to transform the general-purpose computer into a specific machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Turning to operation 902, the material handling apparatus 106 may include means, such as the image-capturing device 108b, for scanning an interior of the container 102, captured based on FOV of the image-capturing device 108b. In an example embodiment, based on the scanning of the view of the interior of the container 102, the image-capturing device 108b, in conjunction with the image-capturing unit 208, may be configured to accumulate 3-D point cloud data.

The FOV of the image-capturing device 108b may be based on various factors, such as an angle of view of the image-capturing device 108b and/or a distance between the image-capturing device 108b and the subject. The interior of the container 102 may include the first set of regions (cluster areas) and the second set of regions (cluster areas). Examples of the first set of regions may include the product wall 120, the floor 124, the ceiling 126, and the back wall 130 of the container 102, and the second set of regions may include the side walls 128 of the container 102.

In an example embodiment, the image-capturing device 108b, such as a 2-D LIDAR, may be configured to continuously accumulate 3-D point cloud data by implementing a Unified Robot Description Format (URDF) model. The present disclosure should not be contemplated to be limited to 2-D LIDAR as the image-capturing device 108b, and the URDF model. Other types of image-capturing device 108b and corresponding formats may also be considered without any variation in the scope of the disclosure.

Turning to operation 904, the material handling apparatus 106 may include means, such as the article manipulator unit 216, for capturing kinematic data collected based on movement of the article manipulator 112 of material handling apparatus 106 during scanning the interior of the container 102. The movement of the article manipulator 112 may be with respect to the container 102. In some embodiments, the kinematic data associated with the article manipulator 112 may correspond to data that defines a motion of the article manipulator 112. More specifically, the kinematic data may include information pertaining to a position of the article manipulator 112, a relative velocity of article manipulator 112, and an acceleration of the article manipulator 112, at a plurality of time instants.

In an example embodiment, the article manipulator unit 216 may be configured to track, in real time, a kinematic chain of joints and links of the article manipulator 112 (e.g., upper arm J1, J2, J3, and J4) with the respect to the image-capturing device 108b on the article manipulator 112. The kinematic chain of joints and links of the article manipulator 112 may include information pertaining to a position, relative velocity, and an acceleration of the article manipulator 112, at the plurality of time instants (determined via joint value sensors, joint distance sensors, proximity sensors, and/or photoelectric sensors). The article manipulator 112 performs a combination of rotation and/or translation from a first position, for example, position A, to another position, for example position B, and may be adapted to cover the complete 3-D FOV of the container 102.

The image-capturing unit 208 may transmit an instruction to the image-capturing device 108b to accumulate the point cloud data of the worksite 100. Concurrently, the image-capturing unit 208 may instruct the article manipulator unit 216 to actuate the article manipulator 112 of the material handling apparatus 106 to traverse along a defined path. As the image-capturing device 108b is mounted on the article manipulator 112, during the traversal of the article manipulator 112, the image-capturing device 108b also traverses along the defined path. In an example embodiment, the image-capturing unit 208 may instruct the image-capturing device 108b to accumulate point cloud data of the view of the interior of the container 102 continuously during the traversal of the article manipulator 112 along the defined path. Further, during the traversal of the article manipulator 112, the article manipulator unit 216 may capture the kinematic data of the article manipulator 112. The article manipulator unit 216 may be adapted to store the kinematic data in the memory 204. In an example embodiment, the kinematic data associated with the article manipulator 112 may correspond to data that defines a motion of the article manipulator 112.

Turning to operation 906, the material handling apparatus 106 may include means, such as the image-capturing unit 208, for generating a 3-D point cloud data based on the point cloud data accumulated by the image-capturing device 108b and the kinematic data captured by the article manipulator unit 216. The generated 3-D point cloud data may correspond to 3-D point cloud data augmented based on the correlation of the accumulated point cloud data with the kinematic data.

To generate the augmented 3-D point cloud data, the image-capturing unit 208 may extract the kinematic data of the article manipulator 112 from the memory 204. Further, the image-capturing unit 208 may correlate the kinematic data with the 3-D point cloud data to generate the augmented 3-D point cloud data. To correlate the kinematic data of the article manipulator 112 with the 3-D point cloud data, the image-capturing unit 208 may determine one or more time instants at which the point cloud data was accumulated by the image-capturing device 108b during the traversal of the article manipulator 112 along the defined path. Further, the image-capturing unit 208 may determine at least the position of the article manipulator 112 at the one or more determined time instants, based on the kinematic data associated with the traversal of the article manipulator 112 along the defined path. Thereafter, the image-capturing unit 208 may be adapted to stitch the accumulated point cloud data, captured at the one or more determined time instants, together in accordance with the determined position of the article manipulator 112 at the one or more determined time instants.

In an example embodiment, the aforementioned operation (i.e., correlation of the accumulated point cloud data and the kinematic data associated with the article manipulator 112) may be performed in real time. In such a scenario, at the instant in which the image-capturing device 108b accumulates the point cloud data, the image-capturing unit 208 may be adapted to receive the position of the article manipulator 112 from the article manipulator unit 216. Thereafter, the image-capturing unit 208 may correlate the accumulated point cloud data in accordance with the position of the article manipulator 112 to generate the augmented 3-D point cloud data. An example 3-D point cloud data of the interior of the container 102 is illustrated as 3-D point cloud data 300 in FIG. 3.

Turning to operation 908, the material handling apparatus 106 may include means, such as the image-processing unit 210, for transforming a first format of the augmented 3-D point cloud data into a second format. The first format of the augmented 3-D point cloud data may correspond to LIDAR data (.las file) that may contain LIDAR point data records. In some embodiments, the first format stores the 3-D point cloud data received from software (e.g. provided by a LIDAR device) which combines global positioning system (GPS), inertial measurement unit (IMU), and laser pulse range data to produce X, Y, and Z point data. The intention of the first format may be to provide an open format that allows different LIDAR hardware and software tools to output data in a common format.

The second format may correspond to a transformed frame compatible with the image-processing unit 210. For example, the second format may correspond to raster data that may be stored as a grid of values which are rendered as pixels. In an embodiment, the first format of the augmented 3-D point cloud data may be transformed to the second format, based on gridding in which a grid is placed on the augmented 3-D point cloud data. Based on the LIDAR points in each cell of the grid, corresponding cell values may be calculated. In another embodiment, the first format of the augmented 3-D point cloud data may be transformed to the second format based on interpolation of the value of each cell. The present disclosure should not be contemplated to be limited to (.las) format as the first format, the raster format as the second format, and the gridding and interpolation as the transformation techniques. Other types of first formats, second formats, and transformation techniques may also be considered without any variation in the scope of the disclosure. An example transformed 3-D point cloud data 400 in the second format is illustrated in FIG. 4.

Turning to operation 910, the material handling apparatus 106 may include means, such as the image-processing unit 210, for pre-processing the 3-D point cloud data. The pre-processing of the 3-D point cloud data may further comprise a plurality of operations 916 to 920, for example, segmentation and removal of noise, reflections, and other artifacts, described in flow chart of FIG. 9B.

Turning to operation 916, the material handling apparatus 106 may include means, such as the image-processing unit 210, for removing noise data points from the 3-D point cloud data in the transformed second format. In various embodiments, the image-processing unit 210 may leverage various noise filtering algorithms, for example statistical-based filtering techniques, neighborhood-based filtering techniques, projection-based filtering techniques, signal processing based methods, partial differential equations-based filtering techniques, and the like, to remove noise and outliers from the augmented 3-D point cloud data.

Turning to operation 918, the material handling apparatus 106 may include means, such as the image-processing unit 210, for segmenting 3-D point cloud data from which noise data points are removed. In some embodiments, the image-processing unit 210 may leverage various segmentation algorithms, for example edge-based segmentation, region growing segmentation, model fitting segmentation, machine learning segmentation, and the like, to group points in subsets, referred to as cluster areas, characterized by having one or more characteristics in common, for example, orientation data, geometric, radiometric, and the like.

Turning to operation 920, the material handling apparatus 106 may include means, such as the image-processing unit 210, for determining a plurality of cluster areas based on segmentation of 3-D point cloud data. Based on the segmentation of the 3-D point cloud data, the image-processing unit 210 may be configured to determine various cluster areas, such as a first set of cluster areas and a second set of cluster areas corresponding in the interior of the container 102.

To cluster the set of points as a cluster area, the image-processing unit 210 may be adapted to define the region to include a single point (interchangeably referred to as an original point) of a plurality of points in the back wall point cloud data 402 of the 3-D point cloud data 400, for example. Thereafter, the image-processing unit 210 may be adapted to determine the orientation of each of one or more points that are adjacent to the original point (included in the region). If the image-processing unit 210 determines that a variance in the orientation of each of the one or more points and the orientation of the original point is within a defined range of orientation, the image-processing unit 210 may modify the boundary of the cluster area to include the one or more points. Therefore, the modified boundary of the cluster area may include the original point and the one or more points adjacent to the original points. This process may be repeated over the 3-D point cloud data 400 until the variance between the orientations of the one or more points (adjacent to the points in the cluster area) and the orientations of the original points in the region, is outside the first defined range of orientation. Similarly, other cluster areas of the plurality of cluster areas may be identified in the 3-D point cloud data 400, for example.

In an alternate example embodiment, the variance of the orientation may be determined between the orientations of the one or more points (adjacent to the cluster area in the 3-D point cloud data 400, for example) and the orientation of the cluster area. In such an embodiment, the image-processing unit 210 may be adapted to determine the orientation of the cluster area prior to determining the variance. In an example embodiment, the orientation of the cluster area may correspond to the orientation of a centroid of the cluster area. Therefore, the image-processing unit 210 may be adapted to determine the centroid of the cluster area. Thereafter, the image-processing unit 210 may be adapted to determine the orientation of the centroid of the cluster area. The orientation of the centroid of the region may be considered as the orientation of the cluster area. Further, based on the orientation of the centroid of the cluster area, the image-processing unit 210 may be adapted to determine the variance between the orientation of the cluster area and the orientations of the one or more points adjacent to the cluster area in the 3-D point cloud data 400, for example. In an alternate embodiment, the image-processing unit 210 may be adapted to consider the orientation of the center of the cluster area to be the orientation of the cluster area, without departing from the scope of the disclosure.

Figure 9A:
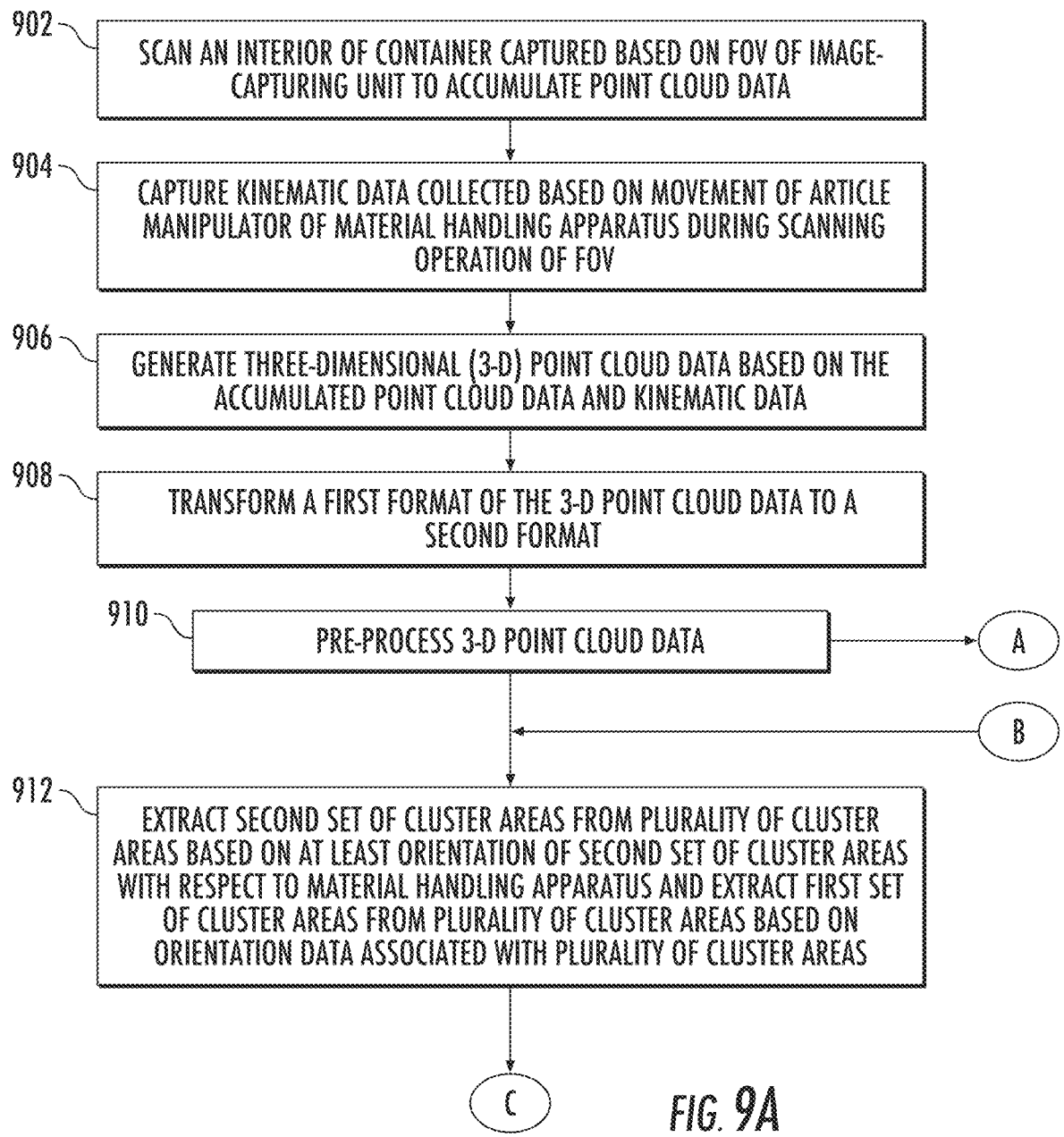
FIGS. 9A-9F are flow diagrams illustrating example methods for operating a material handling apparatus, in accordance with example embodiments described herein.
Figure 9B:
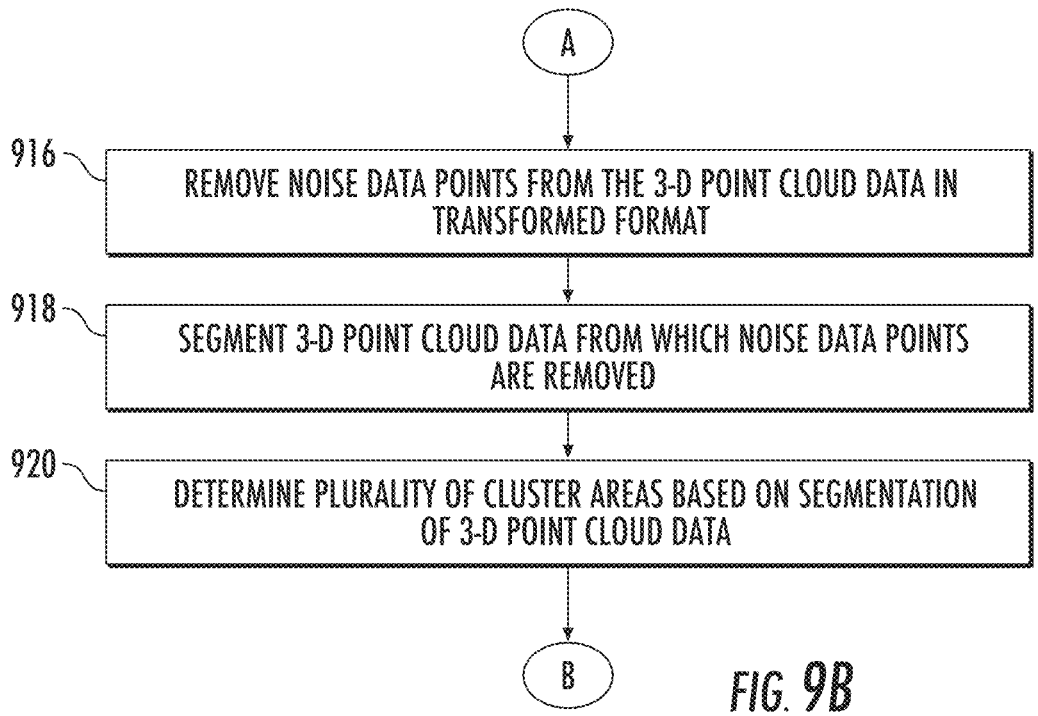
Figure 9C:
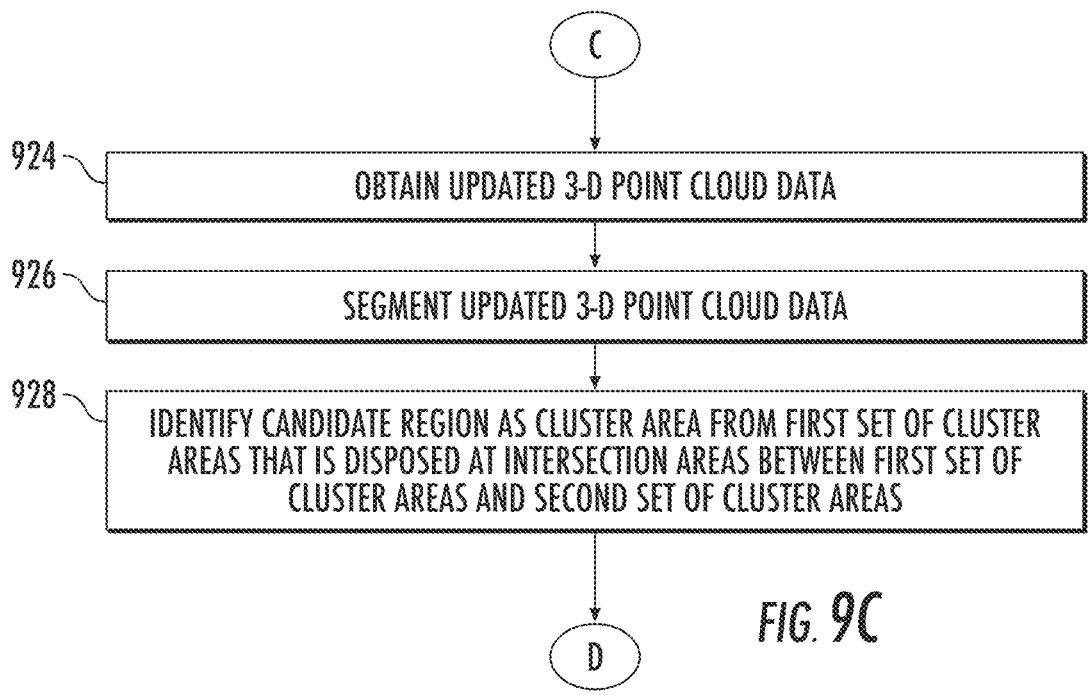
Figure 9D:
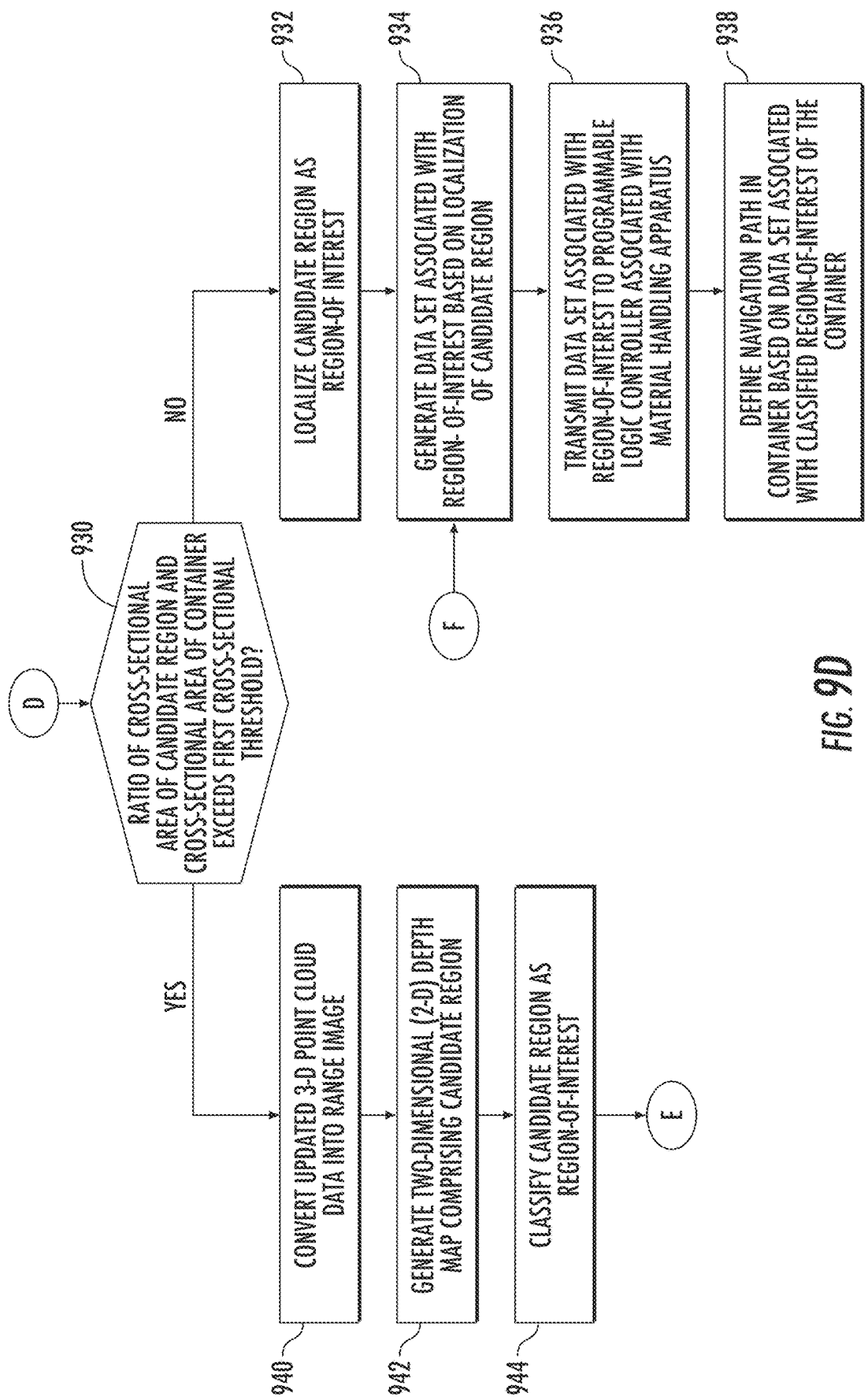
Figure 9E:
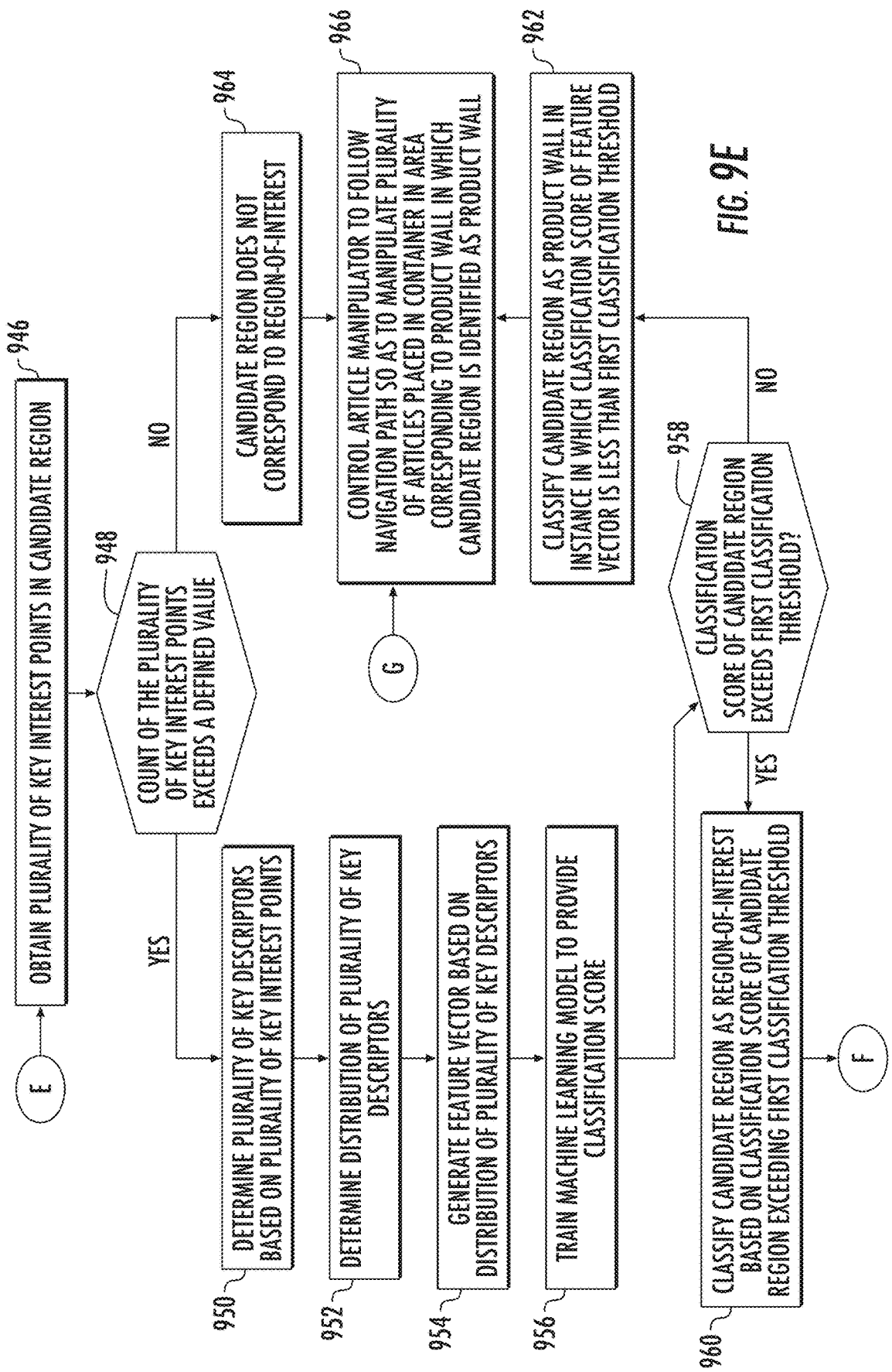
Figure 9F:
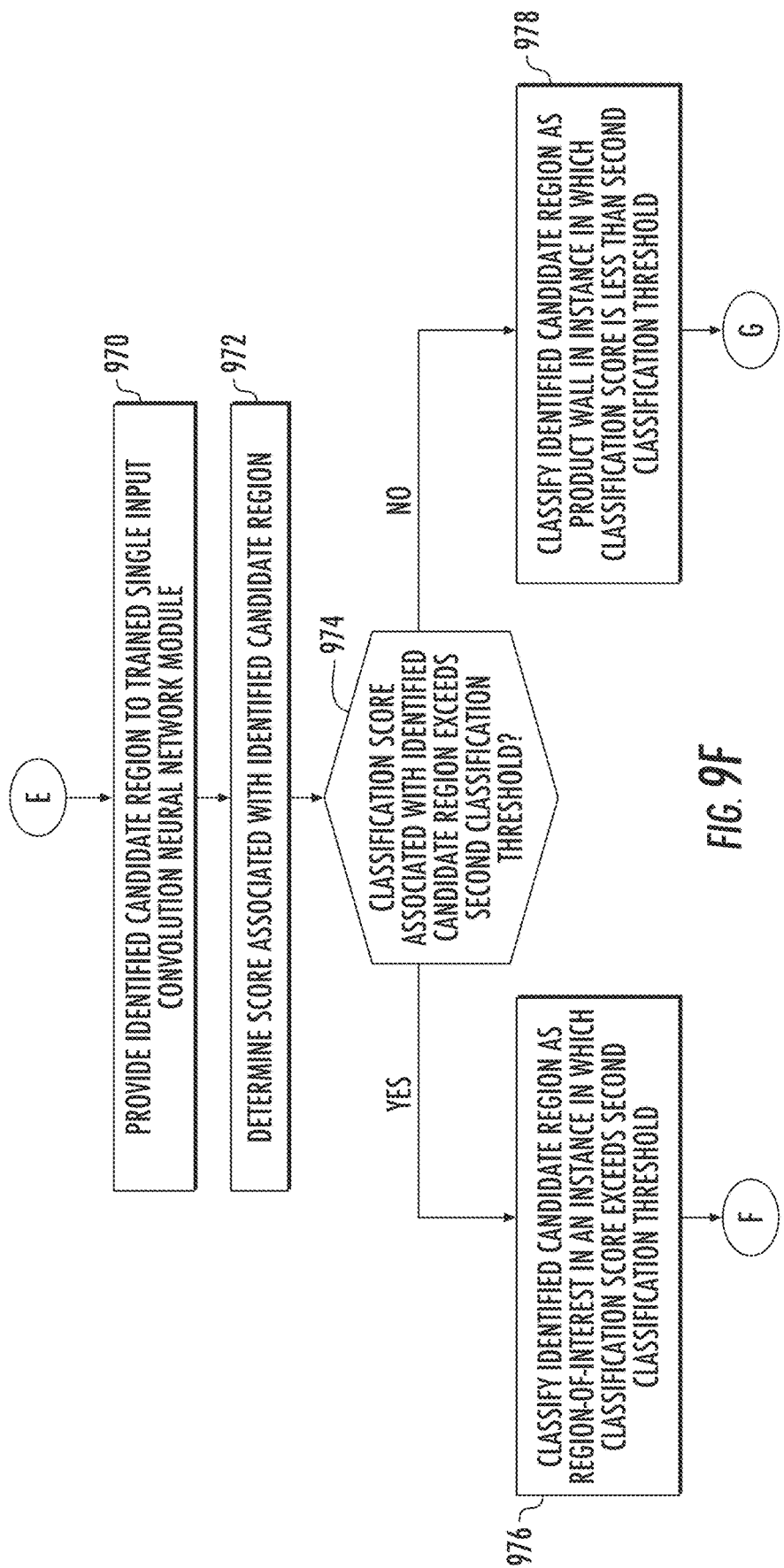

Turning to operation 912 in FIG. 9A, the material handling apparatus 106 may include means, such as the image-processing unit 210, for extracting the second set of cluster areas from the plurality of cluster areas based on at least orientation of the second set of cluster areas with respect to material handling apparatus 106. In an embodiment, the orientation of a point of a plurality of points in each of the plurality of cluster areas may correspond to a measure of pitch and yaw of the point with respect to the material handling apparatus 106.

As discussed above, the orientation of a cluster area may correspond to the orientation of the centroid of the cluster area. Therefore, to determine the orientation of the plurality of cluster area, the image-processing unit 210 may be adapted to determine the orientation of the respective centroid of each cluster area. Thereafter, the image-processing unit 210 may be adapted to check whether the orientation of each cluster area lies within at least one of one or more defined range of orientations. In an example embodiment, the one or more defined range of orientations correspond to a range of orientations that a region of the container 102 may usually have when the material handling apparatus 106 is positioned at the original location in the worksite 100. Further, the one or more defined range of orientations may be stored in the memory 204 prior to starting the operation of the material handling apparatus 106. The following table illustrates an example one or more defined range of orientations corresponding to the one or more regions of the container 102:

TABLE 1

Defined range of orientations

| Type of section of container 102 | Range of Pitch (degrees) | Range of Yaw (degrees) |
|---|---|---|
| One or more sidewalls 128 | 0-10 | −50 to 50 |

Based on the comparison of the determined orientation of the plurality of cluster areas with each of the one or more defined range orientations, the image-processing unit 210 may be adapted to identify the cluster areas represent the second set of cluster areas from the plurality of regions of the container 102.

For example, the image-processing unit 210 may determine that the orientation of a cluster area is 10-degree pitch and 50-degree yaw. The image-processing unit 210 may further determine that the orientation of another cluster area is 5-degree pitch and 0-degree yaw. Thereafter, the image-processing unit 210 compares the orientation of each cluster area with one or more defined ranges of the orientations (illustrated in Table 1 above) to determine if the one cluster area may correspond to a sidewall of the one or more sidewalls 128 of the container 102. Further, the other cluster area may correspond to the floor 124 of the container 102. Therefore, the image-processing unit 210 identifies the cluster area as the second set of cluster areas and the other cluster area as the first set of cluster areas.

Further, the image-processing unit 210 may be adapted to store the information pertaining to the second set of cluster areas in the memory 204. In an example embodiment, the information pertaining to the second set of cluster areas may include, but is not limited to, the orientation of each cluster area in the second set of cluster areas, and a type of a region (of the plurality of regions of the container 102). The type of the plurality of regions may correspond to at least the one or more sidewalls 128 of the container 102, the product wall 120 of the container 102, the floor 124 of the container 102, the ceiling 126, and the back wall 130 of the container 102.

In another embodiment, the image-processing unit 210 may be configured to determine the farthest cluster area and then align the cluster area information with the side wall cluster areas, as the side wall cluster areas are located within a defined vicinity of the cluster area that corresponds to the back wall 130 of the container 102. Thus, the cluster areas that correspond to the side walls are located where the cluster areas converge with the back wall. The back wall 130 and/or the flushed product wall 120 are extracted as first set of cluster areas.

Once the second set of cluster areas from the plurality of cluster areas is identified, the material handling apparatus 106 may include means, such as the image-processing unit 210, for extracting remaining set of clusters (i.e., the first set of cluster areas), from the plurality of cluster areas based on the orientation data associated with the plurality of cluster areas.

Turning to operation 924, the material handling apparatus 106 may include means, such as the image-processing unit 210, for obtaining updated 3-D point cloud data. The updated 3-D point cloud data may comprise 3-D point cloud data from which the second set of cluster areas are clipped. In an example embodiment, the image-processing unit 210 may be configured to leverage various clipping algorithms to clip the identified second set of cluster areas from plurality of cluster areas from the 3-D point cloud data and obtain the updated 3-D point cloud data.

An example updated 3-D point cloud data 500 is illustrated in FIG. 5. The updated 3-D point cloud data 500 includes a first set of updated point cloud data, such as the back wall point cloud data 502, the product wall point cloud data 504, and the floor point cloud data 508. Side walls point cloud data is identified from the second set of cluster areas and clipped.

Turning to operation 926, the material handling apparatus 106 may include means, such as the image-processing unit 210, for segmenting the updated 3-D point cloud data obtained from 3-D point cloud data based on clipping of identified second set of cluster areas. In an example embodiment, the image-processing unit 210 may be configured to segment the updated 3-D point cloud data, based on various segmentation algorithms, for example: edge-based segmentation, region growing segmentation, model fitting segmentation, machine learning segmentation, and the like. Thus, the image-processing unit 210 may group points of the first set of clusters in subsets, referred to as cluster areas, characterized by having one or more characteristics in common, for example: orientation data, geometric, radiometric, and the like.

Turning to operation 928, the material handling apparatus 106 may include means, such as the image-processing unit 210, for identifying candidate regions from the first set of cluster areas that are disposed at intersection areas between the first set of cluster areas and the second set of cluster areas. In an example embodiment, the image-processing unit 210 may be configured to determine intersection areas between the first set of cluster areas and the side walls 128.

Turning to operation 930, the material handling apparatus 106 may include means, such as the image-processing unit 210, for determining a ratio of the cross-sectional area of the candidate region (e.g., the cross-sectional area of the candidate region) and cross-sectional area of the container 102. In an embodiment, the ratio may exceed the first cross-sectional threshold. In such case, control passes to operation 940. In another embodiment, the ratio may fail to exceed the first cross-sectional threshold. In such case, control passes to operation 932. In an example embodiment, the first cross-sectional threshold may be 0.70.

The present disclosure may not be contemplated to be limited to comparing the ratio of the cross-sectional area of the candidate region and the cross-sectional area with the first cross-sectional threshold. Other embodiments in which the difference between the determined cluster region and cross-sectional area of the container 102 may be compared with a defined value, for example 0.2 meters (m). In an example embodiment, if the difference between the determined cluster area and the cross-sectional area of the container 102 exceeds 0.2 m, this implies a substantial difference between the heights of the product wall 120 and the back wall 130, i.e. height of the product wall 120 is substantially greater than the height of the back wall 130. Thus, the back wall 130 may be localized properly based on corresponding cluster area, and data set corresponding to the back wall 130 may be determined. In an alternate example embodiment, if the difference between the determined cluster area and the cross-sectional area of the container 102 fails to exceed 0.2 m, this implies that the height of the product wall 120 is almost equal to the height of the back wall 130. Thus, it may be required to be ascertained that whether the cluster area corresponds to the product wall 120 or the back wall 130.

Turning to operation 932, when the ratio fails to exceed the first cross-sectional threshold, the material handling apparatus 106 may include means, such as the image-processing unit 210, for localizing the candidate region as the region-of-interest. In an embodiment, the region-of-interest may be the back wall 130 of the container 102. The localization of the candidate region, when the candidate region corresponds to the back wall 130 of the container 102, may be based on various localization algorithms.

Turning to operation 934, the material handling apparatus 106 may include means, such as the image-processing unit 210, for generating a data set associated with region-of-interest based on the localization of the candidate region. In an embodiment, the data set may correspond to X, Y, and Z of right lower corner of the back wall to the article manipulator 112.

In an embodiment, based on the classification of the back wall 130, the image-processing unit 210 may determine dimension and orientation information of the back wall 130, based on which the article manipulator unit 216 aligns the article manipulator 112 to pick the product or retract back. The dimension information comprises depth information (X), width information (Y), and height information (Z) of the back wall 130 with respect to the article manipulator 112. The orientation data may be utilized for aligning the article manipulator 112 with respect to the back wall 130. Additionally, the image-processing unit 210 may provide right lower corner information to the processor 202 of the programmable logic controller 116. In accordance with an embodiment, the image-processing unit 210 may be configured to determine an occupancy ratio, such as ratio of area of the back wall 130 candidate and total area of the back wall (i.e. area of the typical trailer), as a part of the data set.

Turning to operation 936, the material handling apparatus 106 may include means, such as the image-processing unit 210, for transmitting the data set associated with the region-of-interest to the processor 202 of the programmable logic controller 116 associated with the material handling apparatus 106.

Turning to operation 938, the material handling apparatus 106 may include means, such as the article manipulator unit 216, for defining a navigation path in the container 102 based on the data set associated with the region-of-interest of the container 102, received from the processor 202. This navigation path may reduce the likelihood or otherwise prevent collisions with the back wall 130 (e.g., the region-of-interest).

Referring back to operation 930, when the ratio exceeds the first cross-sectional threshold, turning to operation 940, the material handling apparatus 106 may include means, such as the image-processing unit 210, for converting the updated 3-D point cloud data into a range image. In an embodiment, projection of the 3-D point cloud data onto an intensity (or range) image may be based on approximate camera parameters. The intensity of the corresponding pixel in the 2D image is the laser intensity of the respective 3-D point in the 3-D point cloud data. In cases where more than one 3-D points are projected onto the same pixel, the intensity of the pixel is the laser intensity of the point that is closest to the position of the image-capturing device 108b.

Turning to operation 942, the material handling apparatus 106 may include means, such as the image-processing unit 210, for generating two-dimensional (2-D) depth map comprising the candidate region. In an embodiment, the depth image includes depth information of each point in the 3-D point cloud with respect to the position of the image-capturing device 108b.

Turning to operation 944, the material handling apparatus 106 may include means, such as the learning and classification unit 212, for classifying the candidate region as the region-of-interest (i.e., the back wall 130). The classification may be performed in accordance with the following operations in FIGS. 9E and 9F. In both the embodiments described in FIGS. 9E and 9F, the training phase for the classification may occur offline. In the training phase, training and validation data may be gathered and the model may be trained using the training data. Thus, in this phase, the learning and classification unit 212 may be trained (e.g., via using the key interest points) using the training data in order to tune the parameters for optimizing the weights defined by the learning and classification unit 212 by continuously assessing the performance of the learning and classification unit 212 using the validation data. Once the learning and classification unit 212 is trained sufficiently so to show satisfactory results on the validation data, the learning and classification unit 212 may be operable in an operational phase. In the operational phase, the learning and classification unit 212 may be frozen and the learning and classification unit 212 may be utilized for testing or real-world testing on a robot or any other device.

In accordance with an example embodiment, turning to operation 946, the material handling apparatus 106 may include means, such as the learning and classification unit 212, for obtaining a plurality of key interest points in the candidate region. In an example embodiment, the candidate region may correspond to the back wall 130. In another embodiment, the candidate region may correspond to the product wall 120. A key interest point in an image may refer to a pixel that has a well-defined position and may be robustly detected (via any of the processes described herein). The key interest point has a high local information content and is ideally repeatable between different images. In an example embodiment, the image-processing unit 210 may be configured to obtain (or extract) the plurality of key interest points in the candidate region by using a Features from Accelerated Segment Test (FAST) algorithm. In accordance with a FAST algorithm, a pixel "p" (with intensity IP) is selected in an image. This is the pixel that may be identified as an interest point. A threshold intensity value T, (such as 20% of the pixel under test) is set. A circle of 16 pixels, for example, surrounding the pixel "p". "N" contiguous pixels, for example 12 contiguous pixels, out of the 16 are required to be either above or below IP by the value T, if the pixel needs to be detected as an interest point. In certain cases, performance of the FAST algorithm may be improved based on a machine learning process.

Turning to operation 948, the material handling apparatus 106 may include means, such as the learning and classification unit 212, for counting and determining whether the plurality of key interest points exceeds a defined value. In an embodiment in which count of the plurality of key interest points fails to exceed the defined value, control passes to operation 964. In another embodiment in which count of the plurality of key interest points exceeds the defined value, control passes to operation 950.

Turning to operation 950, the material handling apparatus 106 may include means, such as the learning and classification unit 212, for determining a plurality of key descriptors based on plurality of key interest points. In an example embodiment, the image-processing unit 210 may be configured to determine the plurality of key descriptors by using Binary Robust Invariant Scalable Key points (BRISK). Given a set of key points (consisting of sub-pixel refined image locations and associated floating-point scale values), the BRISK descriptor is composed as a binary string by concatenating the results of simple brightness comparison tests. BRISK relies on an configurable circular sampling pattern from which it computes brightness comparisons to form the binary descriptor string. In BRISK, the characteristic direction of each key point may be identified to allow for orientation-normalized descriptors and achieve the rotation invariance that is key to general robustness. The brightness comparisons may be carefully selected with the focus on maximizing descriptiveness.

Turning to operation 952, the material handling apparatus 106 may include means, such as the learning and classification unit 212, for determining a distribution of plurality of key descriptors. As illustrated in the example embodiment in FIG. 8A, the plurality of key descriptors may be determined to be outside the designated area 802. Such an embodiment may correspond to a scenario when the 2-D image corresponds to the back wall 130. In another example embodiment, as illustrated in FIG. 8B, a plurality of key descriptors 804 may be determined to be inside the designated area 802. Such an embodiment may correspond to a scenario when the 2-D image corresponds to a flushed product wall, such as the product wall 120. The image-processing unit 210 may be configured to determine the distribution of plurality of key descriptors based on determination of a histogram of the plurality of key descriptors. For example, the image-processing unit 210 may determine the distribution of the plurality of key descriptors 804 with respect to the designated area 802 that may be indicative of the texture of the articles, space between the articles, and the like in the flushed product wall, such as the product wall 120. In other words, the image-processing unit 210 may be configured to detect smaller gaps or edges which cannot be differentiated with the 3D point cloud but may be presented in a range image. This feature may be a major discriminator between a flush product wall, such as the product wall 120, and the back wall 130. Therefore, using the key interest points, significant features may be detected and thereafter, classified to make an assessment for the back wall 130, the product wall 120, or a regular wall (e.g., side wall or the like).

Turning to operation 954, the material handling apparatus 106 may include means, such as the machine learning unit 212A in the learning and classification unit 212, for generating a feature vector based on the distribution of the plurality of key descriptors. In an embodiment, the plurality of key descriptors may be utilized to extract features from the depth map image. Such extracted features may correspond to the feature vector.

In an example embodiment, the machine learning unit 212A may be configured to determine a Histogram of Oriented Gradient (HOG) feature. For extracting the HOG feature, the detected image may be divided into several connected components that are referred to as a "Cell". Then, the gradient pixel by pixel in each Cell may be calculated and the HOG feature may be generated. Finally, the feature descriptor of the detected depth image may be conducted by linear combination of all the Cells in the depth image. Usually the Cells are combined into a bigger block, in which the histogram of Cells is normalized, such that the influence of light and shadow may be reduced. It may be noted that HOG features correspond to edges and corners in depth images.

Turning to operation 956, the material handling apparatus 106 may include means, such as the machine learning unit 212A in the learning and classification unit 212, for training a machine learning model to provide a classification score.

In an example embodiment, a support vector machines (SVM) classifier may be used as a core training machine of learning and classification unit 212. The HOG features may be used for base-level training. After a training round, constraints and convergent values are calculated, and part of a difficulty sample is selected for testing. Samples corresponding to the back wall 130 are put into positive sample collections, and samples corresponding to the product wall 120 are put into negative sample collection. Thus, the HOG features are generated offline and classification models are trained accordingly. Such offline training may facilitate in optimizing parameters of the classification model to better fit the sample data.

Turning to operation 958, the material handling apparatus 106 may include means, such as the machine learning unit 212A in the learning and classification unit 212, for determining whether a classification score of the candidate region exceeds a first classification threshold. In an embodiment, if the classification score of the candidate region exceeds the first classification threshold, the control passes to operation 960. In an embodiment, if the classification score of the candidate region does not exceed the first classification threshold, the control passes to operation 962.

Turning to operation 960, the material handling apparatus 106 may include means, such as the machine learning unit 212A in the learning and classification unit 212, for classifying the candidate region as the region-of-interest based on the classification score of the candidate region exceeding the first classification threshold. In such an embodiment, the region-of-interest may be the back wall 130. Control passes back to operation 934.

Turning to operation 962, the material handling apparatus 106 may include means, such as the machine learning unit 212A in the learning and classification unit 212, for classifying the candidate region as the product wall 120 in instance in which the classification score of feature vector fails to exceed the first classification threshold. Control passes to operation 966.

Referring to operation 948, when the count of the plurality of key interest points does not exceed the defined value, control turns to operation 964. Turning to operation 964, the material handling apparatus 106 may include means, such as the image-processing unit 210, for determining that candidate region does not correspond to a region-of-interest. In other words, the candidate region corresponds to the product wall 120.

Turning to operation 966, the material handling apparatus 106 may include means, such as the article manipulator unit 216, for controlling the article manipulator 112 to manipulate the plurality of articles placed in the container 102 in an area corresponding to the product wall 120 in which candidate region is identified as the product wall 120.

In an alternate example embodiment, in response to the determination of the at least one product in the product wall 120, the navigation unit 214 may be adapted to determine a first navigation path in the container 102. In an example embodiment, the first navigation path in the container 102 is determined based on the identification of the plurality of products flushed as the product wall 120 in the container 102. Further, the navigation unit 214 may be adapted to actuate a plurality of traction devices to facilitate a traversal of the material handling apparatus to the desired location. Thereafter, the processor 202 may instruct the article manipulator unit 216 to actuate the article manipulator 112 to pick the at least one product and place the at least one product at a desired location outside the container 102, for example. The operations of the picking and placing of the at least one product may be repeated until all the products are removed from the container 102. This navigation path may account for the back wall 130 of the container (and side walls, floor, ceiling, etc.) so as to prevent collision with one or more of these elements.

In accordance with another example embodiment, turning to operation 970, the material handling apparatus 106 may include means, such as the image-processing unit 210, for providing the identified candidate region to the trained single input convolution neural network module 212B.

Turning to operation 972, the material handling apparatus 106 may include means, such as the convolution neural network module 212B, for determining a classification score associated with an identified candidate region. In an example embodiment, the convolution neural network module 212B, in accordance with the deep-learning based method, may be configured to perform the basic steps as defined in four layers, as follows:

1. The convolutional (CONV) layer: The 2-D depth map may convolve with a plurality of convolution filters to generate the CONV layers. The convolution layers may compute an output of neurons that are connected to local regions in the input, each computing a dot product between the weights and a small region they are connected to in the input volume.
2. The rectified linear unit (ReLU) layer: A non-linearity may be applied to the convolution layers to define the ReLU layers. ReLU layers may apply an elementwise activation function, such as the max (0, x) thresholding at zero, leaving the size of the volume unchanged.
3. The pooling (POOL) layer: In the POOL layer, the spatial size of the representation may be progressively reduced to reduce the number of parameters and computation in the network based on max pooling operated on each feature map independently. Thus, the POOL layer performs a down sampling operation along the spatial dimensions (width, height), resulting in reduced volume.
4. The fully connected (FC) layer: A layer of fully connected neurons finally compute class scores for the pooled features, based on which the 2-D depth map is classified as the back wall 130.

Turning to operation 974, the material handling apparatus 106 may include means, such as the convolution neural network module 212B, for determining whether the classification score associated with the identified candidate region exceeds a second classification threshold. In an embodiment, the classification score associated with the identified candidate region exceeds the second classification threshold and control passes to operation 976. In another embodiment, the classification score associated with the identified candidate region fails to exceed the second classification threshold and control passes to operation 978.

Turning to operation 976, the material handling apparatus 106 may include means, such as the convolution neural network module 212B, for classifying the identified candidate region as the region-of-interest, i.e. the back wall 130, in an instance in which the classification score exceeds the second classification threshold. Control passes back to operation 934.

Turning to operation 978, the material handling apparatus 106 may include means, such as the convolution neural network module 212B, for classifying the identified candidate region as the product wall 120 in instance in which the classification score fails to exceed the second classification threshold. Control passes back to operation 966.

While the disclosure is described with reference to example embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular example embodiments disclosed for carrying out this disclosure, but that the disclosure will include all example embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or additionally, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the material handling system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A material handling method comprising:
generating, by an image processing unit, three-dimensional (3-D) point cloud data based on a field-of-view (FOV) of an image capturing unit, wherein the FOV comprises an interior of a container;
identifying, by the image processing unit, a plurality of cluster areas of the container interior;
extracting, by the image processing unit, a first set of cluster areas from the plurality of cluster areas based on orientation data associated with the 3-D point cloud data;
determining, by the image processing unit, a candidate region of the first set of cluster areas, wherein the candidate region comprises a cluster area;
determining a ratio of a cross-sectional area of the candidate region and a cross-sectional area of the container;
determining, by a machine learning unit, a classification score of the candidate region when the determined ratio exceeds a first cross-sectional threshold;
classifying, by the machine learning unit, the candidate region as a region-of-interest in an instance in which the classification score of the candidate region exceeds a first classification threshold; and
defining, by a processor, a navigation path in the container based on a data set associated with the region-of-interest, wherein the navigation path is configured to prevent collision with the region-of-interest.

2. The method of claim 1, wherein generating the 3-D point cloud data comprises accumulating:
3-D point cloud data generated based on point cloud data of the FOV captured by an image capturing unit positioned on a material handling apparatuses, and
kinematic data collected based on a movement of an article manipulator of the material handling apparatus during a scanning operation of the FOV.

3. The method of claim 2, further comprising transforming, by the image processing unit, a first format of the 3-D point cloud data to a second format, wherein the first format corresponds to a light detection and ranging frame and the second format corresponds to a transformed frame compatible with the image processing unit.

4. The method of claim 3, further comprising pre-processing, by the image processing unit, the 3-D point cloud data, wherein the pre-processing comprises:
removing, by the image processing unit, noise data points from the 3-D point cloud data in the second format;
segmenting, by the image processing unit, the 3-D point cloud data from which the noise data points are removed; and
determining, by the image processing unit, the plurality of cluster areas based on the segmentation of the 3-D point cloud data.

5. The method of claim 1, further comprising:
extracting, by the image processing unit, a second set of cluster areas from the plurality of cluster areas based on at least an orientation of the second set of cluster areas with respect to a material handling apparatus; and
determining, by the image processing unit, a type of each of the second set of cluster areas of the plurality of cluster areas of the container,
wherein the type of each of the second set of cluster areas corresponds to one of a side wall, a floor area, or a ceiling area of the container, wherein the first set of cluster areas of the plurality of cluster areas correspond to a back wall and a product wall of the docked container.

6. The method of claim 5, further comprising: obtaining, by the image processing unit, updated 3-D point cloud data, wherein the updated 3-D point cloud data comprises 3-D point cloud data from which the second set of cluster areas are clipped.

7. The method of claim 6, further comprising:
segmenting, by the image processing unit, the updated 3-D point cloud data;
determining, by the image processing unit, the first set of cluster areas based on the segmentation of the updated 3-D point cloud data; and
identifying, by the image processing unit, the candidate region as the cluster area of the first set of cluster areas that is disposed at intersection areas between the first set of cluster areas and the second set of cluster areas, wherein the candidate region defines a 2-D depth map.

8. The method of claim 7, further comprising:
converting, by the image processing unit, the updated 3-D point cloud data into a range image, wherein the generation of the 2-D depth map is based on the range image and corresponds to depth information associated with a point in the 3-D point cloud data.

9. The method of claim 7, further comprising:
generating, by the processor, the data set associated with the region-of-interest based on localization of the candidate region; and
transmitting, by the processor, the data set associated with the region-of-interest to a programmable logic controller associated with the material handling apparatus.

10. The method of claim 7, further comprising:
providing, by the processor, the identified candidate region to a trained single input convolution neural network module;
determining, by the convolution neural network module, a score associated with the identified candidate region;
classifying, by the convolution neural network module, the identified candidate region as a region-of-interest in an instance in which the classification score exceeds a second classification threshold, wherein the region-of-interest is a back wall of the container; and
classifying, by the convolution neural network module, the identified candidate region as a product wall in an instance in which the classification score fails to exceed the second classification threshold.

11. The method of claim 10, further comprising:
defining, by the processor, a navigation path in the container based on a data set associated with the classified region-of-interest in an instance in which the classification score fails to exceed the second classification threshold; and
controlling, by an article manipulation unit, an article manipulator to follow the navigation path to manipulate a plurality of articles placed in the container in an area corresponding to the product wall.

12. The method of claim 7, wherein the classification of the candidate region further comprises:
obtaining, by the machine learning unit, a plurality of key interest points in the candidate region,
wherein in an instance in which a count of the plurality of key interest points exceeds a defined value, the candidate region corresponds to the region-of-interest,
wherein in an instance in which the count of the plurality of key interest points fails to exceed the defined value, the candidate region does not correspond to the region-of-interest.

13. The method of claim 12, wherein the classification of the candidate region further comprises:
determining, by the machine learning unit, a plurality of key descriptors based on the plurality of key interest points;
determining, by the machine learning unit, a distribution of the plurality of key descriptors; and
generating, by the machine learning unit, a feature vector based on the distribution of the plurality of key descriptors.

14. The method of claim 13, wherein the classification of the candidate region further comprises:
training, by the machine learning unit, a machine learning model to provide the classification score; and
classifying, by the machine learning unit, the candidate region as a product wall in an instance in which the classification score of the feature vector fails to exceed the first classification threshold.

15. The method of claim 1, further comprising:
controlling, by an article manipulation unit, an article manipulator to follow the navigation path and manipulate a plurality of articles placed in the container.

16. The method of claim 1, further comprising:
localizing, by the image processing unit, the candidate region as the region-of-interest in an instance in which the difference between the cross-sectional area of the container and the cross-sectional area of the cluster area fails to exceed the first cross-sectional threshold.

17. A material handling apparatus comprising:
an article manipulator;
an image-capturing device positioned on the material handling apparatus; and
a processor communicatively coupled with the article manipulator, an image processing unit, and the image-capturing device, wherein the processor is adapted to:
cause the image processing unit to generate three-dimensional (3-D) point cloud data based on a field-of-view (FOV) of the image capturing unit, wherein the FOV comprises an interior of a container;
cause the image processing unit to identify a plurality of cluster areas of the container interior;
cause the image processing unit to extract a first set of cluster areas from a plurality of cluster areas based on orientation data associated with the 3-D point cloud data;
cause the image processing unit to:
determine a candidate region of the first set of cluster areas, wherein the candidate region comprises a cluster area; and
determine a ratio of a cross-sectional area of the candidate region and a cross-sectional area of the container;
cause a machine learning unit to determine a classification score of the candidate region in an instance in which the determined ratio exceeds a first cross-sectional threshold;
cause the machine learning unit to classify the candidate region as a region-of-interest in an instance in which the classification score of the candidate region exceeds a first classification threshold; and
define a navigation path in the container based on a data set associated with the classified region-of-interest, wherein the navigation path is configured to prevent collision with the region-of-interest.

18. A control system for a material handling apparatus, the control system comprising:
- an image-capturing device; and
- a processor communicatively coupled to the image-capturing device and an image processing unit, wherein the processor is adapted to:
  - cause the image processing unit to generate three-dimensional (3-D) point cloud data based on a field-of-view (FOV) of the image capturing unit, wherein the FOV comprises an interior of a container;
  - cause the image processing unit to identify a plurality of cluster areas of the container interior;
  - cause the image processing unit to extract a first set of cluster areas from a plurality of cluster areas based on orientation data associated with the 3-D point cloud data;
  - cause the image processing unit to:
    - determine a candidate region of the first set of cluster areas, wherein the candidate region comprises a cluster area; and
    - determine a ratio of a cross-sectional area of the candidate region and a cross-sectional area of the container;
  - cause a machine learning unit to determine a classification score of the candidate region in an instance in which the determined ratio exceeds a first cross-sectional threshold;
  - cause the machine learning unit to classify the candidate region as a region-of-interest in an instance in which the classification score of the candidate region exceeds a first classification threshold; and
  - define a navigation path in the container based on a data set associated with the classified region-of-interest, wherein the navigation path is configured to prevent collision with the region-of-interest.

19. The control system of claim 18, wherein the processor is further adapted to cause an article manipulation unit to control an article manipulator to follow the navigation path and manipulate a plurality of articles placed in the container.

20. The control system of claim 18, wherein the processor is further adapted to cause the image processing unit to localize the candidate region as the region-of-interest in an instance in which the difference between the cross-sectional area of the container and the cross-sectional area of the cluster area fails to exceed the first cross-sectional threshold.

* * * * *